United States Patent
Smuk

(10) Patent No.: US 10,351,020 B2
(45) Date of Patent: Jul. 16, 2019

(54) RECLINER FOR A VEHICLE SEAT

(71) Applicant: Faurecia Automotive Seating, LLC, Auburn Hills, MI (US)

(72) Inventor: Wojciech Smuk, Troy, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 70 days.

(21) Appl. No.: 15/718,089

(22) Filed: Sep. 28, 2017

(65) Prior Publication Data

US 2018/0086229 A1     Mar. 29, 2018

Related U.S. Application Data

(60) Provisional application No. 62/401,523, filed on Sep. 29, 2016.

(51) Int. Cl.
| | |
|---|---|
| *B60N 2/20* | (2006.01) |
| *B60N 2/02* | (2006.01) |
| *B60N 2/235* | (2006.01) |
| *B60N 2/22* | (2006.01) |

(52) U.S. Cl.
CPC ......... *B60N 2/0232* (2013.01); *B60N 2/0224* (2013.01); *B60N 2/0248* (2013.01); *B60N 2/20* (2013.01); *B60N 2/22* (2013.01); *B60N 2/236* (2015.04); *B60N 2002/0216* (2013.01); *B60N 2002/0236* (2013.01)

(58) Field of Classification Search
CPC .... B60N 2/0232; B60N 2/236; B60N 2/0224; B60N 2/0248; B60N 2/20; B60N 2/22
USPC ................. 297/362.11, 366, 367 R
See application file for complete search history.

(56) References Cited

U.S. PATENT DOCUMENTS

| | | | |
|---|---|---|---|
| 3,550,875 A | 12/1970 | Settimi | |
| 5,104,084 A | 4/1992 | Kumagai | |
| 5,299,853 A | 4/1994 | Griswold | |
| 5,871,259 A | 2/1999 | Gehart | |
| 6,788,048 B2 | 9/2004 | Hedayat | |
| 7,192,089 B2* | 3/2007 | Boudinot | B60N 2/0232 297/217.3 |
| 7,222,919 B2 | 5/2007 | Uramichi | |
| 7,293,752 B2 | 11/2007 | McCulloch | |
| 7,330,008 B2 | 2/2008 | Lee | |
| 7,360,838 B2 | 4/2008 | Smuk | |
| 7,594,699 B2* | 9/2009 | Satta | B60N 2/0244 297/361.1 |

(Continued)

FOREIGN PATENT DOCUMENTS

| | | |
|---|---|---|
| CN | 103182961 B | 7/2015 |
| DE | 10309083 A1 | 9/2004 |

OTHER PUBLICATIONS

Extended European Search Report for European App. No. 17193929.1 established Feb. 26, 2018, 4111 EP II, 8 pages.

(Continued)

*Primary Examiner* — Syed A Islam
(74) *Attorney, Agent, or Firm* — Barnes & Thornburg LLP

(57) ABSTRACT

An occupant support adapted for use in a vehicle includes a seat bottom coupled to a floor of the vehicle and a seat back configured to pivot about a seat-back pivot axis relative to the seat bottom between an upright position and a folded-forward position. The occupant support further includes a seat-motion controller configured to control movement of the seat back relative to the seat bottom.

17 Claims, 16 Drawing Sheets

(56) References Cited

U.S. PATENT DOCUMENTS

| | | |
|---|---|---|
| 8,285,454 B2 | 10/2012 | Norton |
| 8,491,054 B2 | 7/2013 | Myers |
| 8,651,578 B2 | 2/2014 | Yamada |
| 8,845,027 B2 | 9/2014 | Nock |
| 9,387,781 B2 | 7/2016 | Matt |
| 2002/0171280 A1 | 11/2002 | Okazaki |
| 2004/0217638 A1 | 11/2004 | Shao |
| 2006/0202537 A1 | 9/2006 | Smuk |
| 2007/0289092 A1 | 12/2007 | Rohee |
| 2012/0074750 A1 | 3/2012 | Moriyama |
| 2012/0205956 A1 | 8/2012 | Nock |
| 2012/0261963 A1 | 10/2012 | Heyer |
| 2013/0320735 A1 | 12/2013 | McCulloch |
| 2014/0152067 A1 | 6/2014 | Pleskot |
| 2014/0225411 A1 | 8/2014 | Matt |
| 2015/0069809 A1* | 3/2015 | Matt ............ B60N 2/2252 297/366 |
| 2016/0023577 A1 | 1/2016 | Yamada |
| 2016/0023578 A1 | 1/2016 | Tame |
| 2016/0101710 A1 | 4/2016 | Bonk |
| 2016/0280098 A1 | 9/2016 | Frye |

OTHER PUBLICATIONS

International (PCT) Search Report and Written Opinion completed on Jul. 14, 2017 for PCT/US2017/026824, 3980 PCT II, 18 pages.
Office Action dated Feb. 26, 2019 for U.S. Appl. No. 15/829,071, 4172 US-U II, (pp. 1-8).

* cited by examiner

RECLINER FOR A VEHICLE SEAT

PRIORITY CLAIM

This application claims priority under 35 U.S.C. § 119(e) to U.S. Provisional Application No. 62/401,523, filed Sep. 29, 2016, which is expressly incorporated by reference herein.

BACKGROUND

The present disclosure relates to occupant supports, and particularly to movable occupant supports. More particularly, the present disclosure relates to occupant supports with reclining seat backs for use in vehicles.

SUMMARY

According to the present disclosure, a vehicle includes an occupant support mounted to a floor of the vehicle. The occupant support includes a seat bottom coupled to the floor of the vehicle for movement therewith and a seat back coupled to the seat bottom for movement about a seat-back pivot axis relative to the seat bottom between an upright position and a folded-forward position. The occupant support further includes a seat-motion controller configured to control movement of the seat back about the seat-back pivot axis relative to the seat bottom.

In illustrative embodiments, the seat-motion controller is configured to provide means for controlling movement of the occupant support in one of a powered fine-adjustment mode and a powered gross-movement mode. In the powered fine adjustment mode, the seat back is configured to rotate about the seat-back pivot axis relative to the seat bottom between the upright position and the folded-forward position at a first rotational speed in response to an electric energy being supplied to a motor connected to the seat-motion controller. In the powered gross-movement mode, the seat back rotates about the seat-back pivot axis relative to the seat bottom at a second rotational speed greater than the first rotational speed between the upright position and the folded-forward position in response to the electric energy being supplied to the motor.

In illustrative embodiments, the seat-motion controller includes a fixed flange, a mobile flange, and a recliner control unit. The fixed flange is coupled to the seat bottom. The mobile flange is coupled to the seat back for rotation with the seat back about the seat-back pivot axis relative to the fixed flange. The recliner control unit is configured to rotate the mobile flange about the seat-back pivot axis relative to the fixed flange. In illustrative embodiments, the seat-motion controller is movable between a fine-adjustment mode in which the recliner control unit is configured to rotate at a first rotational speed to cause the mobile flange to rotate at a second rotational speed and a gross-movement mode in which the recliner control unit is configured to rotate at a third rotational speed to cause the mobile flange to rotate at a fourth rotational speed.

In illustrative embodiments, the recliner control unit includes a mode controller and a gross-movement driver. The mode controller rotates the mobile flange in the fine-adjustment mode. The gross-movement driver rotates the mobile flange in the gross-movement mode.

In illustrative embodiments, the gross-movement driver includes a first gear coupled to the mobile flange and a second gear coupled to the mode controller. The second gear is spaced apart from the first gear in the fine-adjustment mode to allow the mode controller to rotate the mobile flange. The second gear is meshed with the first gear in the gross-movement mode to allow the second gear to rotate the first gear and the mobile flange.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
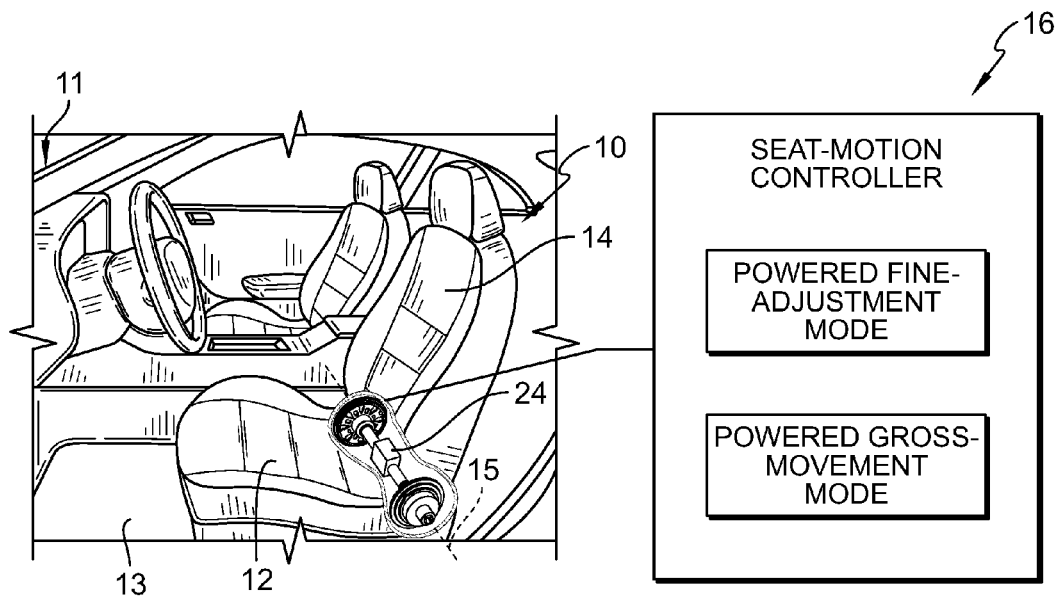
FIG. 1 is a perspective and diagrammatic view of a passenger vehicle showing an occupant support in accordance with the present disclosure on a driver side of the passenger vehicle, the occupant support includes a seat bottom mounted to a floor of the vehicle, a seat back mounted to the seat bottom to pivot relative to the seat bottom, and a seat-motion controller coupled to the seat bottom and the seat back to control motion of the seat back about a seat-back pivot axis relative to the seat bottom, and suggesting that the seat-motion controller is configured to move the occupant support between an upright position and a folded-forward position in one of a powered fine-adjustment mode as suggested in FIG. 2 and a powered gross-movement mode as suggested in FIG. 3.
Figure 2:
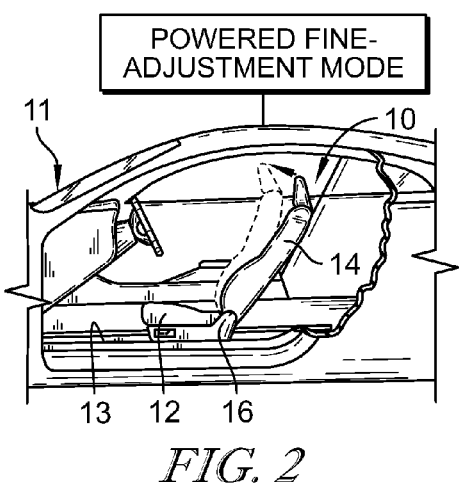
FIG. 2 is a view similar to FIG. 1 suggesting that, in the powered fine-adjustment mode, the seat-motion controller pivots the seat back about the seat-back pivot axis relative to the seat bottom incrementally in response to power being supplied to the seat-motion controller to adjust slowly the position of the seat back.
Figure 3:
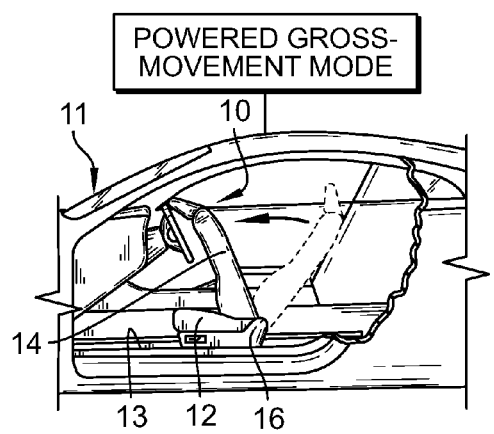
FIG. 3 is a view similar to FIG. 1 suggesting that, in the powered gross-movement mode, the seat-motion controller pivots the seat back about the seat-back pivot axis relative to the seat bottom liberally in response to power being supplied to the seat-motion controller to adjust quickly the position of the seat back.

A seat-motion controller 16 in accordance with the present disclosure is adapted for use with an occupant support 10 of a vehicle 11 as shown in FIGS. 1-3. Occupant support 10 includes a seat bottom 12 mounted to a floor 13 of vehicle 11, a seat back 14 that extends away from seat bottom 12, and seat-motion controller 16 coupled to seat bottom 12 and seat back 14. Seat-motion controller 16 is configured to move seat back 14 relative to seat bottom 12 between an upright position, shown in FIGS. 1 and 2, and a folded-forward position, suggested in FIG. 3, in one of a fine-adjustment mode and a gross-movement mode.

In the fine-adjustment mode, seat-motion controller 16 moves seat back 14 incrementally between the upright position and the folded-forward position in response to an input as suggested in FIG. 2. The input includes, for example, the operator or a vehicle system activating a motor controller 26. In the gross-movement mode, seat-motion controller 16 moves seat back 14 liberally between the upright position and the folded-forward position in response to the input as suggested in FIG. 3. Seat back 14 is locked in position relative to seat bottom 12 when the input is removed to set a selected memory position of the seat back relative to the seat bottom.

In some embodiments, seat-motion controller 16 is electrically driven in both the fine-adjustment mode and the gross-movement mode. In other embodiments, seat-motion controller 16 is manually or electrically driven in one or both of the fine-adjustment mode and the gross-movement mode. Powered operation is referred to as powered fine-adjustment mode or powered gross-movement mode.

Figure 4:
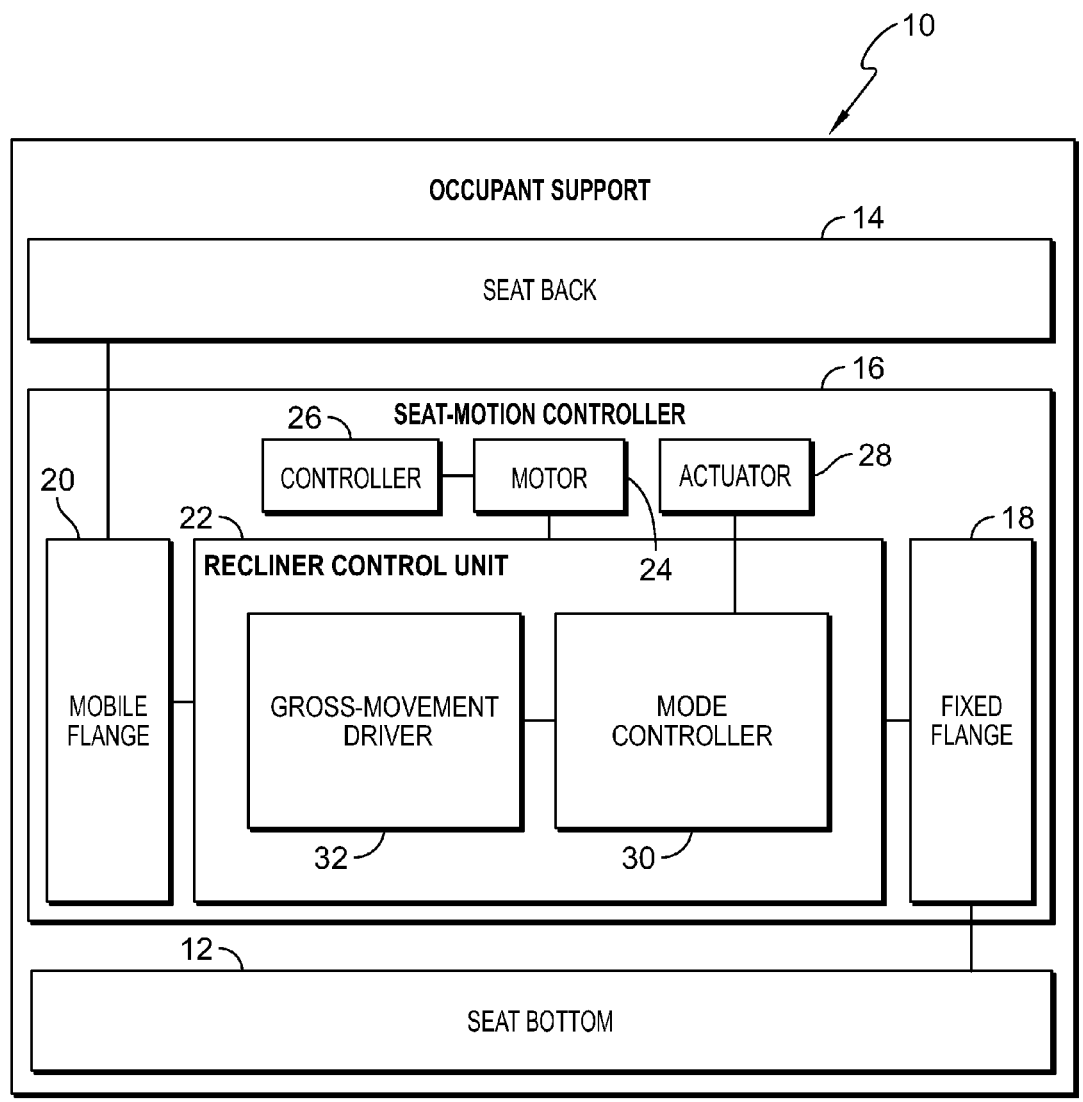
FIG. 4 is a diagrammatic view of the occupant support of FIG. 1 showing that the occupant support includes the seat bottom, the seat back, and the seat-motion controller, the seat-motion controller includes a fixed flange coupled to the seat bottom, a mobile flange coupled to the seat back, and a recliner control unit coupled to the fixed flange and the mobile flange, and showing that the recliner control unit includes a mode controller and a gross-movement driver configured to rotate the mobile flange relative to the fixed flange, and further showing that the seat-motion controller further includes a motor coupled to the recliner control unit, a motor controller connected to the motor, and an actuator coupled to the mode controller.

Seat-motion controller 16 includes a fixed flange 18, a mobile flange 20, and a recliner control unit 22 as shown in FIG. 4. Fixed flange 18 is coupled to seat bottom 12 and blocked from rotating relative to seat bottom 12. Mobile flange 20 is coupled to seat back 14 for rotation with seat back 14 about a seat-back pivot axis 15 relative to fixed flange 18 and seat bottom 12. Recliner control unit 22 is configured to drive rotation of mobile flange 20 in the powered fine-adjustment mode and the powered gross-movement mode in response to the electric energy being supplied to a motor 24 connected to recliner control unit 22.

Recliner control unit includes a mode controller 30 and a gross-movement driver 32 as shown in FIG. 4. Mode controller 30 rotates mobile flange 20 at the first rotational speed in response to the electric energy being supplied to motor 24 in the powered fine-adjustment mode. Gross-movement driver 32 rotates mobile flange 20 at the second rotational speed in response to the electric energy being supplied to motor 24 in the powered gross-movement mode.

Figure 5:
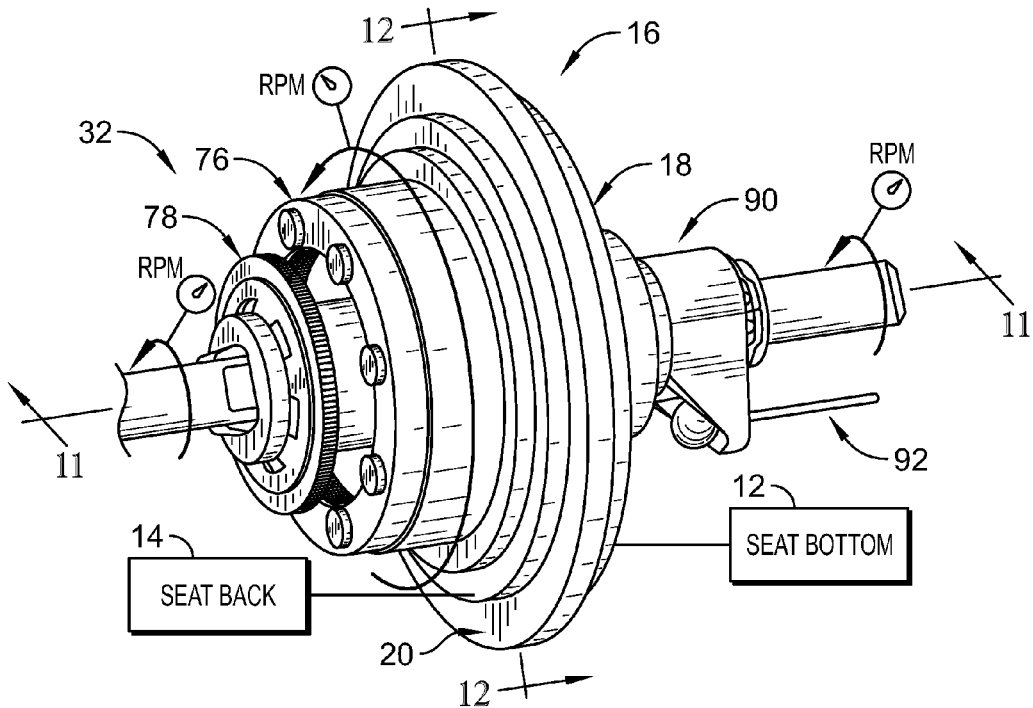
FIG. 5 is a perspective and diagrammatic view of the recliner control unit included in the seat-motion controller shown in FIG. 1 showing that the fixed flange is coupled to the seat bottom and the mobile flange is coupled to the seat back and suggesting that the seat-motion controller is in the powered fine-adjustment mode in which the motor rotates the mode controller at the second rotational speed which causes the mobile flange to rotate at the first rotational speed.
Figure 6:
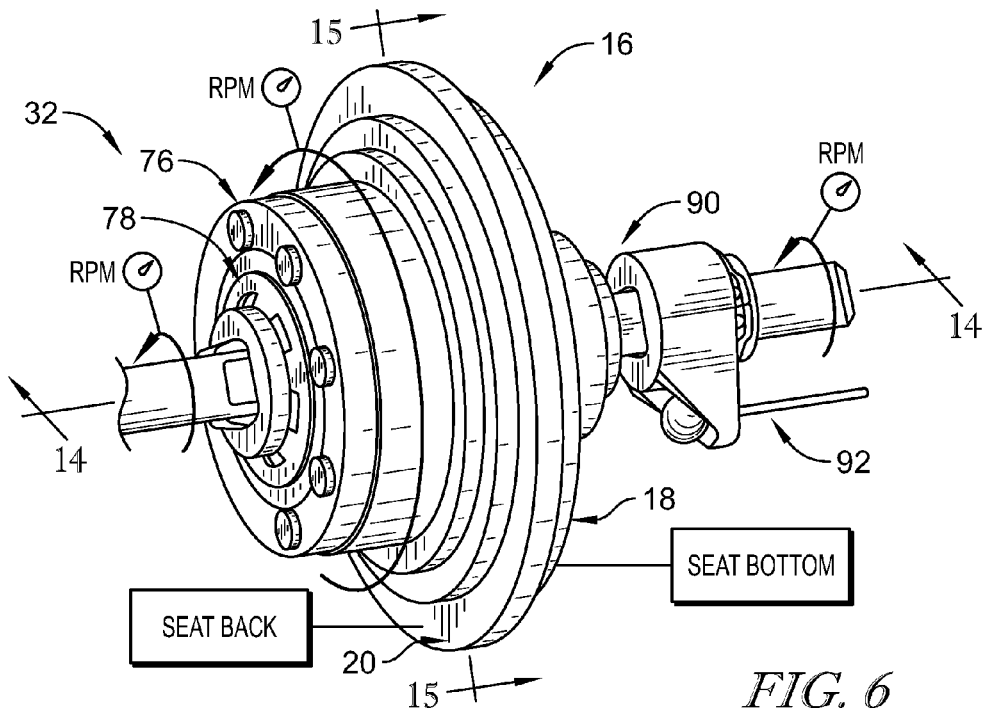
FIG. 6 is a view similar to FIG. 5 showing the seat-motion controller in the powered gross-movement mode and suggesting that the motor rotates the gross-movement driver at the second rotational speed which causes the mobile flange to rotate at the second rotational speed.

Gross-movement driver 32 includes an internal gear 76 coupled to mobile flange 20 for rotational movement therewith and a spur gear 78 coupled to mode controller 30 for rotational movement therewith as shown in FIGS. 5 and 6. Spur gear 78 is spaced apart from internal gear 76 in the powered fine-adjustment mode to free mode controller 30 to rotate mobile flange 20 at the first rotational speed as shown in FIG. 5. Spur gear 78 is meshed with internal gear 76 in the powered gross-movement mode and mode controller 30 disengages mobile flange 20 to allow spur gear 78 to drive internal gear 76 and mobile flange 20 at the second rotational speed as shown in FIG. 6.

Occupant support 10 includes seat bottom 12, seat back 14, and seat-motion controller 16 as shown in FIGS. 1-4. In the illustrative embodiment, occupant support 10 is a driver side occupant support 10 as shown in FIG. 1. Seat bottom 12 is coupled to floor 13 of vehicle 11 for movement therewith. Seat back 14 is coupled to seat bottom 12 for movement about seat-back pivot axis 15 relative to seat bottom 12 between the upright position and the folded-forward position. Seat-motion controller 16 is configured to provide means for controlling movement of seat back 14 about seat-back pivot axis 15 relative to seat bottom 12.

As suggested in FIGS. 5 and 6, seat-motion controller 16 is configured to provide means for controlling movement of occupant support 10 in one of the fine-adjustment mode in which seat back 14 rotates about seat-back pivot axis 15 relative to seat bottom 12 between the upright position and the folded-forward position at the first rotational speed in response to an electric energy being supplied to motor 24 connected to seat-motion controller 16 and the gross-movement mode in which seat back 14 rotates about seat-back pivot axis 15 relative to seat bottom 12 at the second rotational speed between the upright position and the folded-forward position in response to the electric energy being supplied to motor 24 and the second rotational speed is different than the first rotational speed. Seat-motion controller 16 is biased toward the fine-adjustment mode and seat-motion controller 16 blocks seat back 14 from rotating relative to seat bottom 12 while electric energy is not supplied to seat-motion controller 16 to lock seat back 14 in a selected position relative to seat bottom 12 in the powered fine-adjustment mode.

Figure 7:
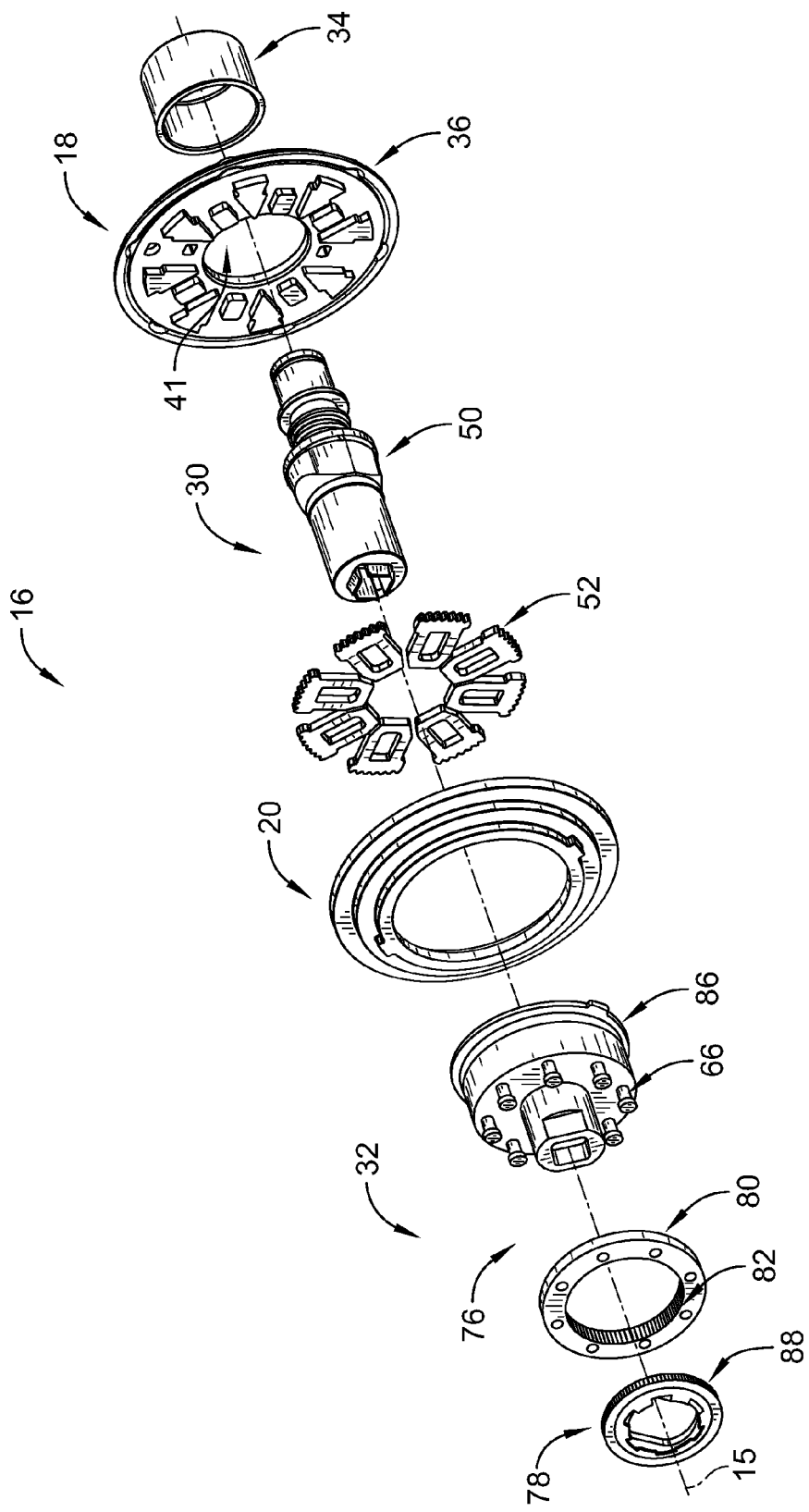
FIG. 7 is an exploded assembly view of the seat-motion controller showing that the seat-motion controller includes, from left to right, the gross-movement driver which includes a spur gear and an internal gear, the mobile flange, the mode controller which includes a cam-shaft unit and a plurality of pawls arranged around the seat-back pivot axis, and the fixed flange which includes a static disc and a bushing.

In one example, seat back 14 may be adjusted between about 17 degrees and about 45 degrees in the powered fine-adjustment mode. Seat back 14 may be moved in the powered gross-movement mode to an easy entry position to allow access behind occupant support 10, for example, to allow a rear passenger to enter vehicle 11. In one example, seat back 14 may be moved to be about parallel with seat bottom 12 in the powered gross-movement mode Seat-motion controller 16 includes fixed flange 18, mobile flange 20, and recliner control unit 22 as shown in FIGS. 4 and 7. Fixed flange 18 is coupled to seat bottom 12 and is blocked from rotating about seat-back pivot axis 15 relative to seat bottom 12. Mobile flange 20 is coupled to seat back 14 and is configured to rotate seat back 14 about seat-back pivot axis 15 when mobile flange 20 is rotated relative to fixed flange 18. Recliner control unit 22 is configured to rotate selectively mobile flange 20 relative to fixed flange 18 at different speeds to move seat back 14 between the upright position and the folded-forward position at different speeds.

Seat-motion controller 16 further includes motor 24, motor controller 26, and an actuator 28 as shown in FIG. 4.

Motor 24 drives recliner control unit 22 in both the powered fine-adjustment mode and the powered gross-movement mode in response to input. Input includes input from a passenger or from vehicle systems such as a vehicle computer. In the illustrative embodiment, motor 24 rotates at the second rotational speed in both the powered fine-adjustment mode and the powered gross-movement mode. Motor controller 26 is configured to control activation of motor 24 and stores information indicative of seat memory positions for returning seat back 14 to a previously selected position relative to seat bottom 12. Actuator 28 moves seat-motion controller 16 between the powered fine-adjustment mode and the powered gross-movement mode.

Fixed flange 18 and mobile flange 20 included in seat-motion controller 16 are configured to move relative to one another as suggested in FIGS. 5 and 6. As a result, in other embodiments, fixed flange 18 is coupled to seat back 14 for movement therewith and mobile flange 20 is coupled to seat bottom 12 for movement therewith.

Figure 8:
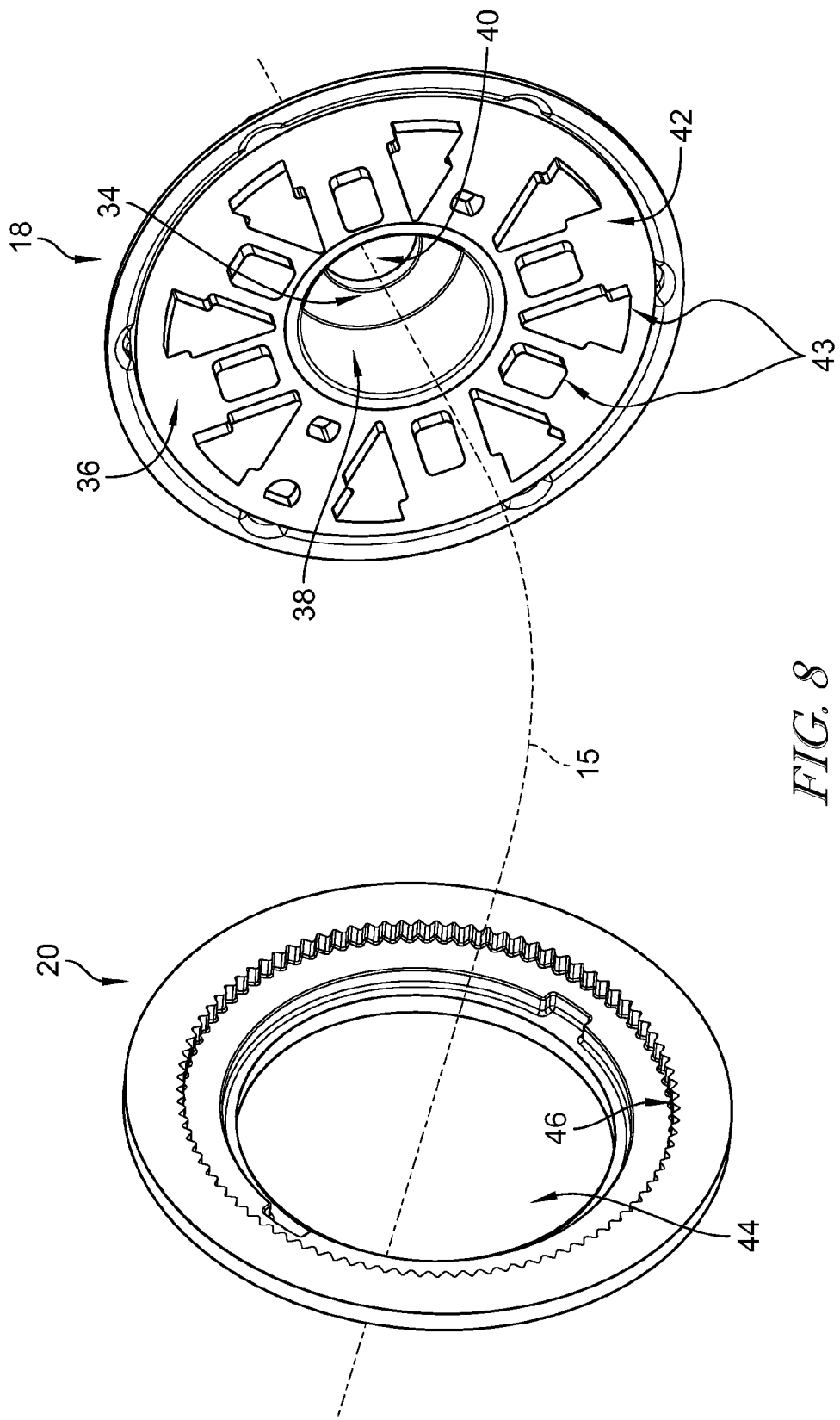
FIG. 8 is a perspective view of the mobile flange and the fixed flange included in the seat-motion controller showing that the mobile flange includes a plurality of flange teeth configured to mate with teeth included in the plurality of pawls and that the fixed flange includes pawl guides configured to limit movement of the pawls to radially in-and-out movement.

Fixed flange 18 includes a bushing 34 and a static disc 36 as shown in FIGS. 7 and 8. Bushing 34 is arranged circumferentially about seat-back pivot axis 15 and a portion of recliner control unit 22. Static disc 36 extends radially outward away from bushing 34 and is coupled to seat bottom 12 for movement therewith. Illustratively, static disc 36 is welded to seat bottom 12. In other embodiments, static disc 36 is coupled to seat bottom 12 by fasteners or any other suitable alternative.

Bushing 34 is formed to define a shaft-unit receiving cavity 38 and a bushing aperture 40 as shown in FIG. 8. Shaft-unit receiving cavity 38 is sized to receive a portion of a cam-shaft unit 50 included in mode controller 30. Bushing aperture 40 is arranged to open into shaft-unit receiving cavity 38 and allows cam-shaft unit 50 to extend through fixed flange 18 so that, for example, cam-shaft unit 50 can be driven by a coupling shaft that is rotated by motor 24.

Static disc 36 includes a static-disc body 42 and pawl guides 43 as shown in FIG. 8. Static-disc body 42 is formed to define an aperture 41 that extends therethrough for receiving cam-shaft unit 50. Pawl guides 43 extend axially away from static-disc body 42 and are arranged circumferentially about seat-back pivot axis 15. Pawl guides 43 limit movement of pawls 52 included in mode controller 30 to radial in-and-out movement.

Mobile flange 20 is formed to include an aperture 44 and a plurality of flange teeth 46 as shown in FIG. 8. Cam-shaft unit 50 extends through aperture 44 formed in mobile flange 20. The plurality of flange teeth 46 are arranged circumferentially about seat-back pivot axis 15 and extend radially inwardly toward seat-back pivot axis 15. Mobile flange 20 is coupled to internal gear 76 included in gross-movement driver 32.

Figure 10:
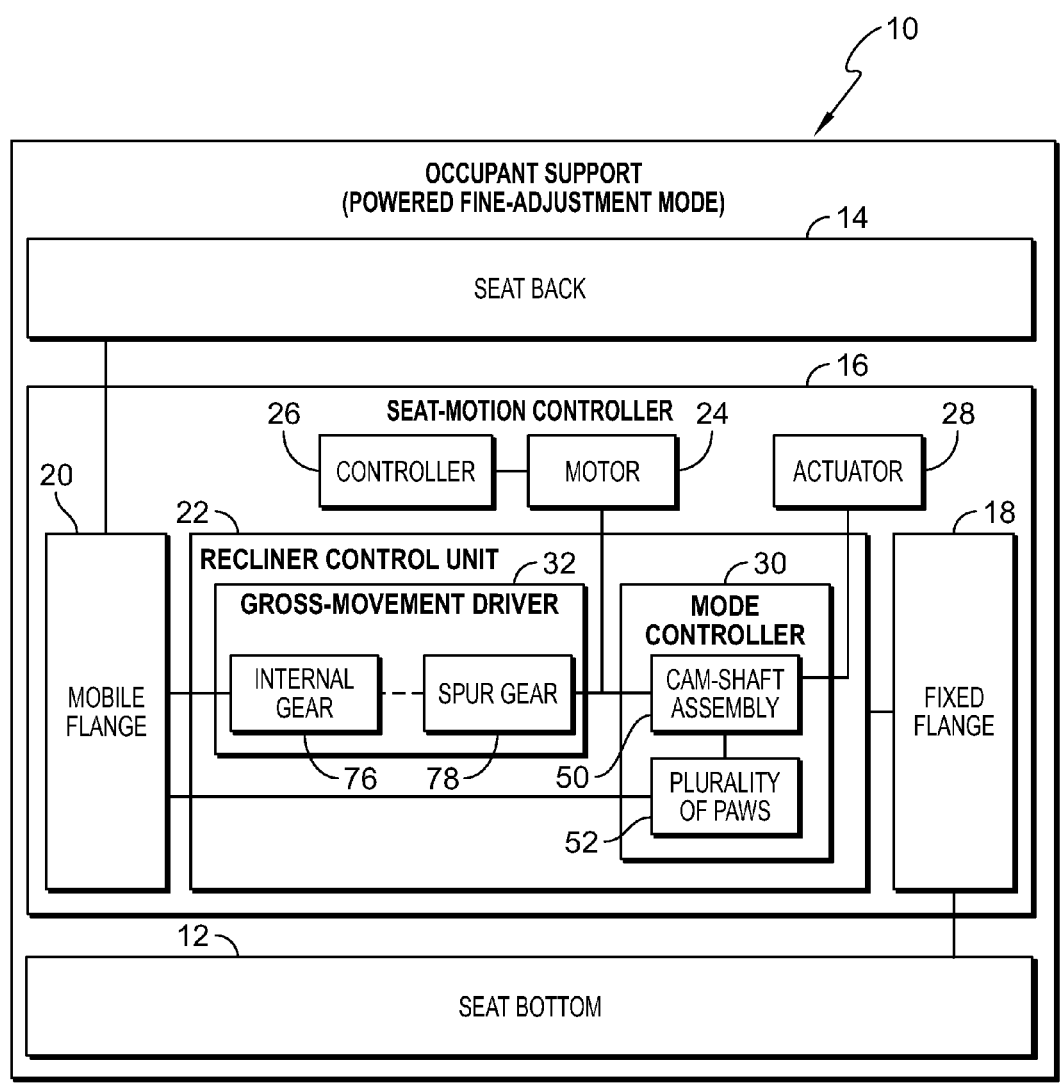
FIG. 10 is a diagrammatic view of the occupant support in the fine-adjustment mode showing that the spur gear is disengaged with the internal gear included in the gross-movement driver and that the plurality of pawls are engaged with the mobile flange and suggesting that energizing the motor drives the cam-shaft unit and the plurality of pawl which causes the mobile flange and the seat back to pivot about the seat-back pivot axis relative to the seat bottom at the first rotational speed.
Figure 13:
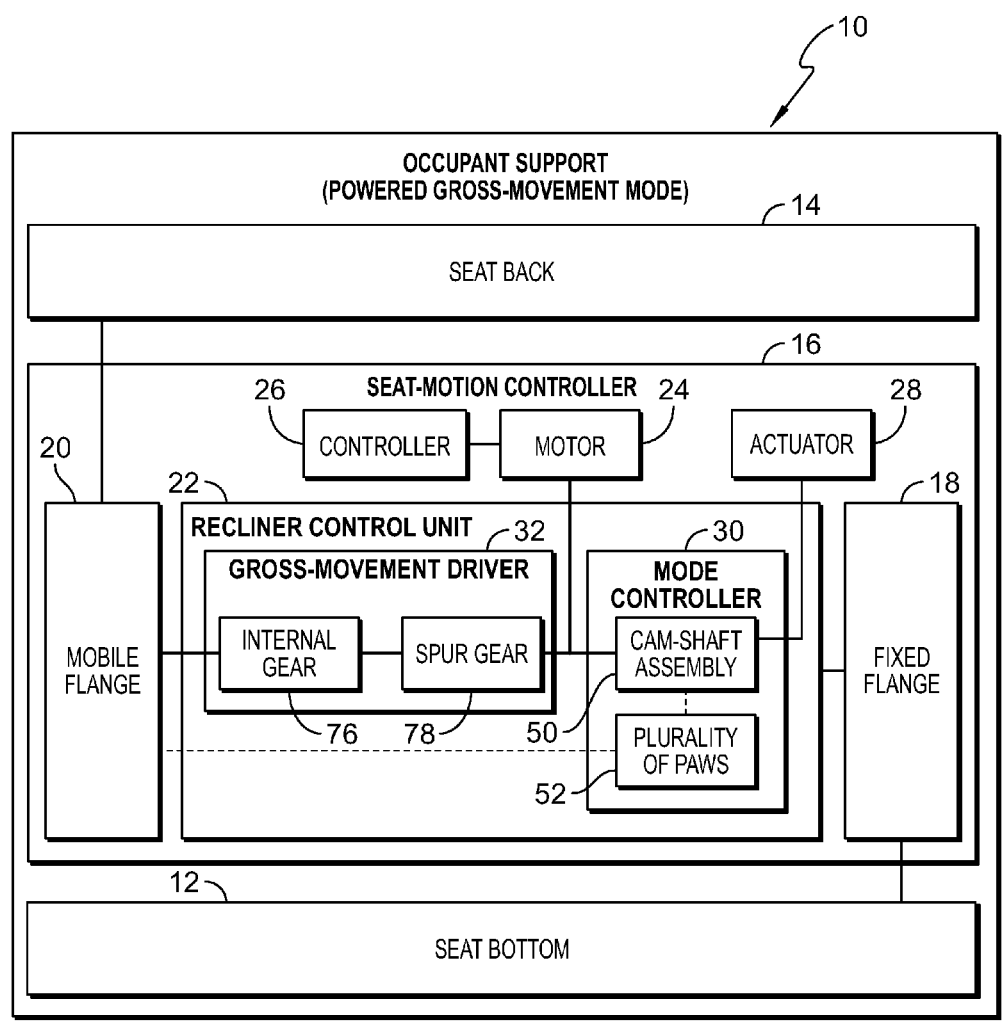
FIG. 13 is a diagrammatic view of the occupant support in the powered gross-movement mode showing that the actuator is activated to move the cam-shaft unit to cause the spur gear to engage the internal gear included in the gross-movement driver and to cause the plurality of pawls to disengage with the mobile flange and suggesting that energizing the motor drives the cam-shaft unit and the spur gear which cause the mobile flange and the seat back to pivot about the seat-back pivot axis relative to the seat bottom at the second rotational speed.

Recliner control unit 22 is configured to move mobile flange 20 relative to fixed flange 18 as suggested in FIGS. 10 and 13. Reference is hereby made to P.C.T. Application No. PCT/US17/26824 filed Apr. 4, 2017 and titled RECLINER FOR A VEHICLE SEAT for disclosure relating to such recliner control unit, which application is hereby incorporated in its entirety herein.

Figure 11:
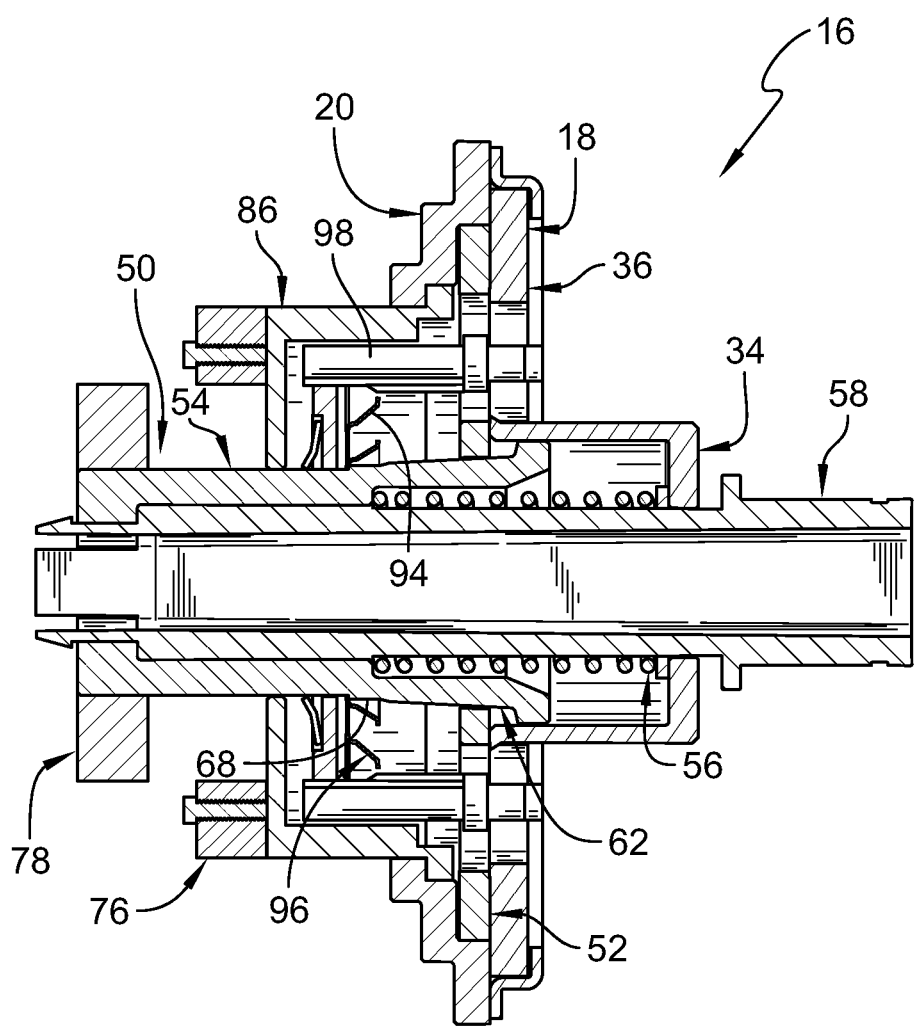
FIG. 11 is a sectional view of the seat-motion controller taken along line 11-11 of FIG. 5 showing the seat-motion controller in the powered fine-adjustment mode in which the spur gear included in the gross-movement driver is disengaged with the internal gear and that at least one of the plurality of pawls are engaged with the mobile flange.

Recliner control unit 22 includes a mode controller 30 and gross-movement driver 32 as shown in FIG. 11. Mode controller 30 moves recliner control unit 22 between the powered fine-adjustment mode and the powered gross-movement mode in response to input activating the actuator 28. Mode controller 30 rotates mobile flange 20 at the first rotational speed relative to fixed flange 18 in response to operator input when recliner control unit 22 is in the powered fine-adjustment mode. Gross-movement driver 32 rotates mobile flange 20 at a second rotational speed relative to fixed flange 18 in response to operator input when recliner control unit 22 is in the powered gross-movement mode. The second rotational speed is greater than the first rotational speed to quickly move seat back 14 relative to seat bottom 12 in the gross-movement mode.

Figure 9:
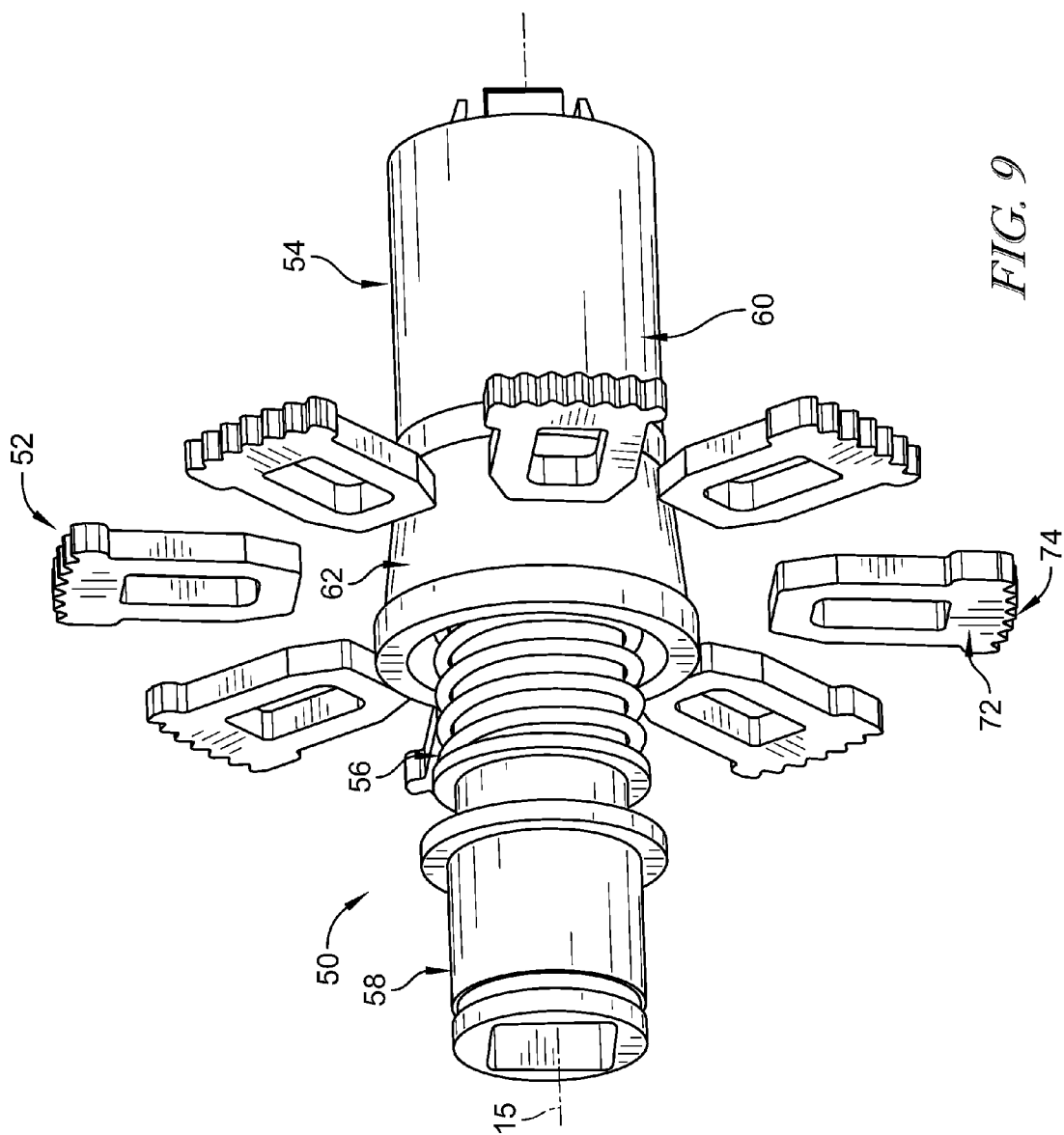
FIG. 9 is a perspective view of the mode controller included in the recliner control unit showing that the mode controller includes the plurality of pawls and the cam-shaft unit and that the cam-shaft unit includes a rotor, a bias member, and a drive shaft configured to rotate the rotor about the seat-back pivot axis.

Mode controller 30 includes cam-shaft unit 50 and a plurality of pawls 52 as shown in FIG. 9. Cam-shaft unit 50 extends along seat-back pivot axis 15 and is configured to move mode controller 30 between a fine-adjustment arrangement, shown in FIG. 11, and a gross-movement arrangement, shown in FIG. 14, in response to activation of actuator 28. Seat-motion controller 16 is in the powered fine-adjustment mode when mode controller 30 is in the fine-adjustment arrangement and seat-motion controller 16 is in the powered gross-movement mode when mode controller 30 is in the gross-movement arrangement. The plurality of pawls 52 are arranged circumferentially about cam-shaft unit 50 and move radially outwardly and inwardly relative to seat-back pivot axis 15 in response to rotation of cam-shaft unit 50.

Figure 14:
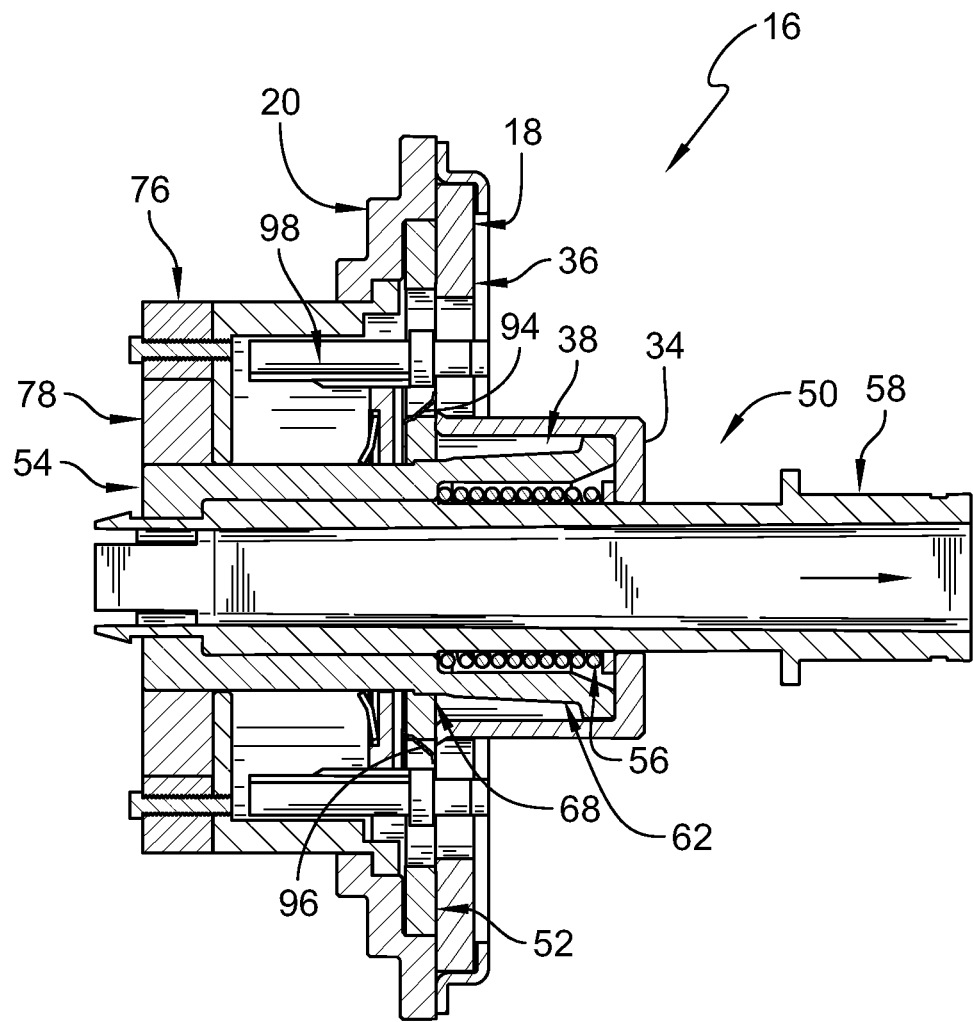
FIG. 14 is a sectional view of the seat-motion controller taken along line 14-14 of FIG. 6 showing the seat-motion controller in the powered gross-movement mode in which the spur gear is engaged with the internal gear included in the gross-movement driver and that the plurality of pawls are disengaged with the mobile flange.

Cam-shaft unit 50 is coupled to actuator 28 and is configured to be moved axially relative to seat-back pivot axis 15 by actuator 28 as suggested in FIGS. 11 and 14. Cam-shaft unit 50 is configured to move axially between an extended position shown in FIG. 11 and a retracted position shown in FIG. 14 to move mode controller 30 between the fine-adjustment arrangement and the gross-movement arrangement, respectively.

Cam-shaft unit 50 includes a rotor 54, a bias member 56, and a drive shaft 58 as shown in FIG. 9. Rotor 54 is configured to push pawls 52 radially outward toward mobile flange 20 or allow pawls 52 to move radially inward toward seat-back pivot axis 15. Bias member 56 is positioned between rotor 54 and fixed flange 18 and biases rotor 54 away from fixed flange 18 to bias cam-shaft unit 50 toward the extended position and away from the retracted position as suggested in FIG. 11. Drive shaft 58 is coupled to motor 24 and rotor 54 for axial and rotational movement therewith.

Rotor 54 is configured to rotate in a clockwise direction and a counter-clockwise direction. Rotor 54 includes central hub 60 and cam 62 as shown in FIG. 9. Central hub 60 extends axially along seat-back pivot axis 15 and has a maximum radius that is smaller than a maximum radius of cam 62. Cam 62 extends radially outward away from central hub 60 toward the plurality of pawls 52.

Central hub 60 is aligned axially with pawls 52 when cam-shaft unit 50 is in the retracted position to provide space for pawls 52 to move radially inward away from mobile flange 20 toward seat-back pivot axis 15 as shown in FIG. 14. Cam 62 is eccentric shaped and aligned axially with pawls 52 when cam-shaft unit 50 is in the extended position and pushes at least one of the pluralities of pawls 52 radially outward toward mobile flange 20 as shown in FIG. 11.

Figure 12:
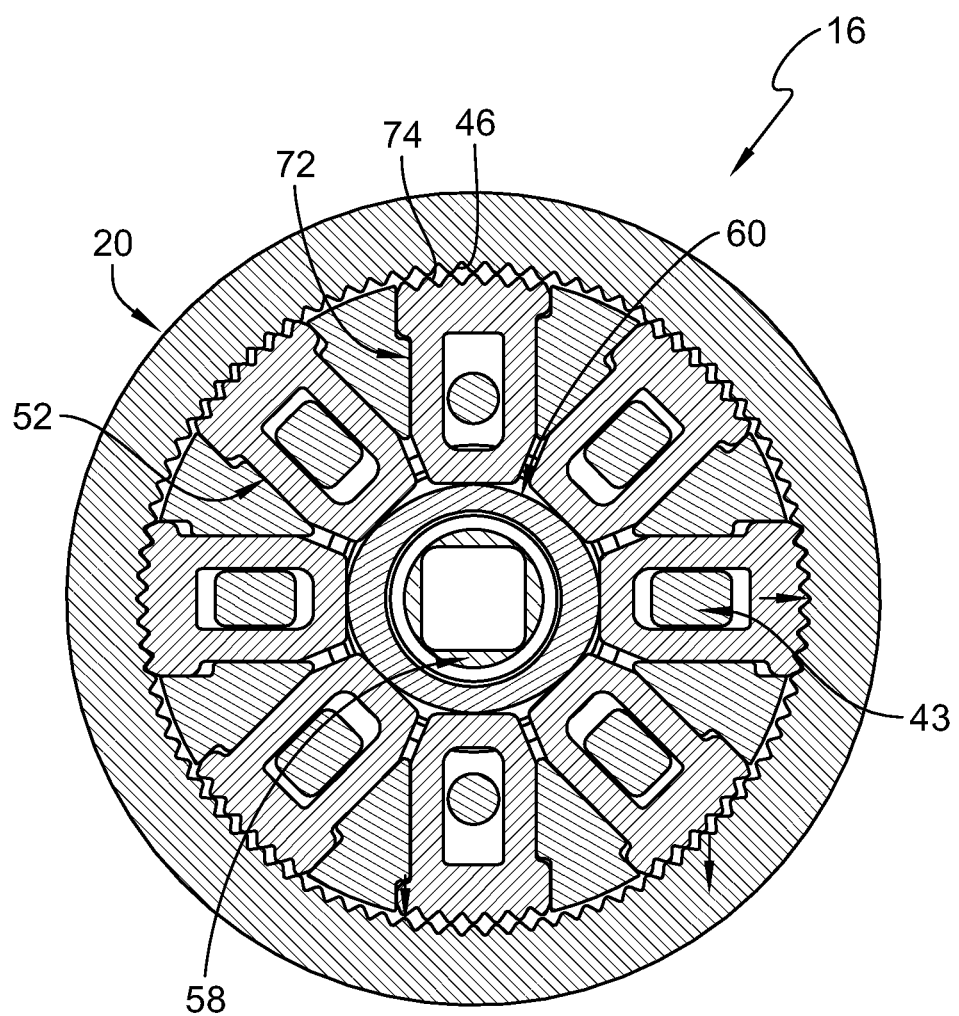
FIG. 12 is a sectional view of the seat-motion controller taken along line 12-12 of FIG. 5 showing that, in the powered fine-adjustment mode, at least one of the plurality of pawls is engaged with the mobile flange and suggesting that rotation of the cam-shaft unit causes the pawls to move radially inward and outward in a predetermined sequence to rotate the mobile flange at the first rotational speed.

In the illustrative embodiment, cam 62 pushes at least one and less than all of the plurality of pawls 52 radially outward toward mobile flange 20 in the extended position as shown in FIG. 12. When rotor 54 is not rotating, the at least one and less than all of the plurality of pawls 52 engage mobile flange 20 to block rotation of mobile flange 20. When rotor 54 rotates with drive shaft 58 about seat-back pivot axis 15, the non-circular shape of cam 62 pushes alternating subsets of pawls 52 radially outward while other subsets of pawls 52 are free to move radially inward. As a result, pawls 52 apply net rotation force to mobile flange 20 that causes mobile flange 20 to rotate about seat-back pivot axis 15.

Drive shaft 58 is coupled to rotor 54 to cause rotor 54 to rotate with drive shaft 58 about seat-back pivot axis 15 as suggested in FIG. 10. Drive shaft 58 includes a collar 90 and a pull chord 92 coupled to actuator 28 as shown in FIGS. 5 and 6. Actuator 28 is configured to move drive shaft 58 axially via collar 90 and pull chord 92 to move cam-shaft unit 50 axially and cause seat-motion controller 16 to assume the powered gross-movement mode.

Each pawl 52 includes a pawl body 72 and a plurality of pawl teeth 74 that extend radially outward away from pawl body 72 as shown in FIG. 9. Pawl teeth 74 are adapted to engage and disengage flange teeth 46 included in mobile flange 20 to control movement of mobile flange 20. Pawl teeth 74 of at least one pawl 52 engage flange teeth 46 included in mobile flange 20 to block rotation of mobile flange 20 when seat-motion controller 16 is in the powered fine-adjustment arrangement and motor 24 is not energized. Pawl teeth 74 move into and out of engagement with flange teeth 46 in a predetermined pattern to rotate mobile flange 20 incrementally when seat-motion controller 16 is in the powered fine-adjustment arrangement and motor 24 is energized. Pawl teeth 74 are spaced apart from flange teeth 46 when seat-motion controller 16 is in the powered gross-movement mode to allow gross-movement driver 32 to rotate mobile flange 20 as suggested in FIG. 15.

In the illustrative embodiment, mode controller 30 further includes a pawl retainer 94 as shown in FIGS. 11 and 14. Pawl retainer 94 reduces or eliminates interaction (sometimes called ratcheting) between mobile flange 20 and pawls 52 when seat-motion controller 16 is in the gross-movement mode. Pawl retainer 94 includes a mask 96 and pins 98. Mask 96 moves pawls 52 radially inward and blocks radial outward movement of pawls 52 when seat-motion controller 16 is in the gross-movement arrangement. Pins 98 block rotation of mask 96 about seat-back pivot axis 15 relative to fixed flange 18. In the illustrative embodiment, pawl retainer 94 may reduce or eliminate undesirable noise and tactile effects caused by pawls 52 interacting with mobile flange 20 when mobile flange 20 rotates while seat-motion controller 16 moves in the gross-movement mode.

Gross-movement driver 32 includes internal gear 76 and spur gear 78 as shown in FIGS. 10 and 13. Internal gear 76 is coupled to mobile flange 20 for movement therewith. Spur gear 78 is coupled to cam-shaft unit 50 and configured to rotate internal gear 76 and, thus, mobile flange 20 when seat-motion controller 16 is in the powered gross-movement mode.

Internal gear 76 includes a hub 86 and a mount band 80 as shown in FIG. 7. Hub 86 is coupled to mobile flange 20 and includes a plurality of retainers 66 to couple to mount band 80. The mount band 80 is arranged circumferentially around the seat-back pivot axis 15 and is coupled to hub 86 for rotation therewith by retainers 66. Mount band 80 includes a plurality of internal teeth 82 that extend radially inwardly from mount band 80 toward seat-back pivot axis 15.

Spur gear 78 includes a spur band 84 and a plurality of external teeth 88 as shown in FIGS. 5-7. Spur band 84 is arranged circumferentially about seat-back pivot axis 15 and is coupled to cam-shaft unit 50 for rotational and axial movement therewith. External teeth 88 extend radially outward away from spur band 84 and seat-back pivot axis 15 toward internal gear 76. External teeth 88 are configured to mesh with internal teeth 82 included in internal gear 76 to mate internal gear 76 with spur gear 78 for rotational movement therewith.

Figure 15:
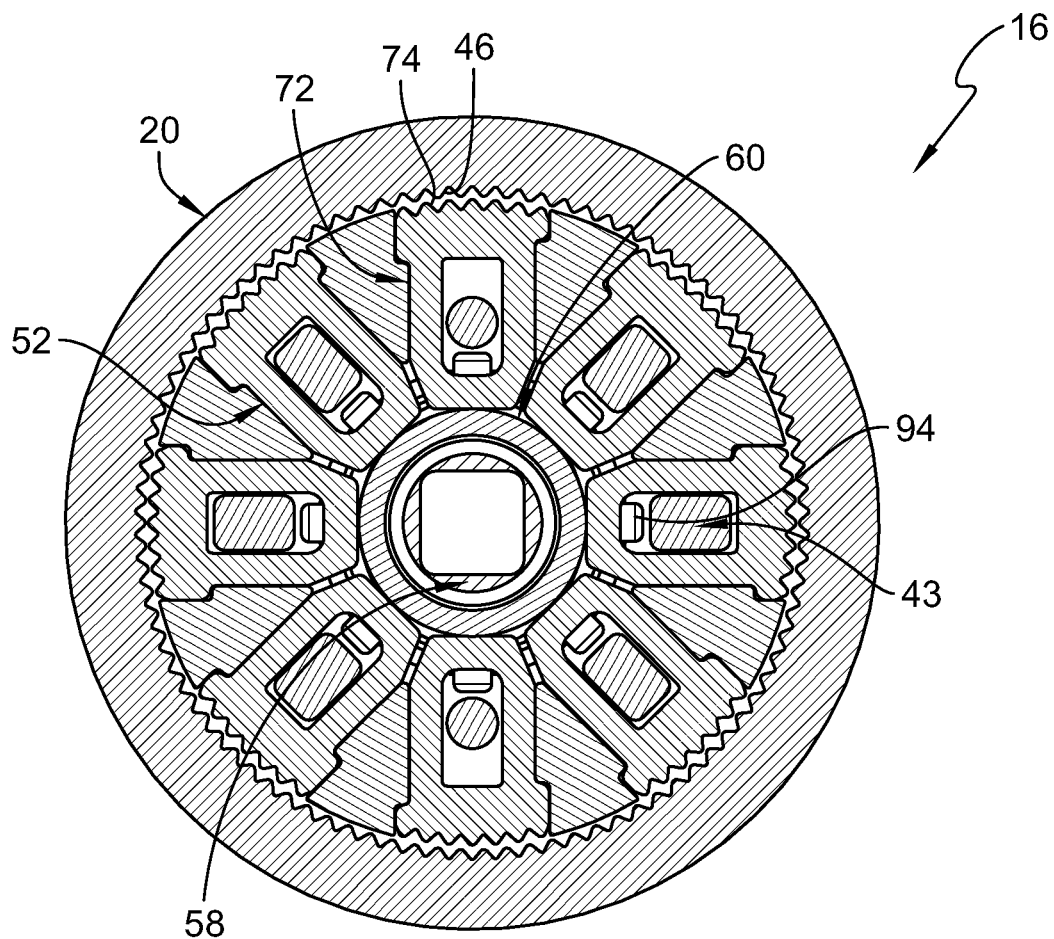
FIG. 15 is a sectional view of the seat-motion controller taken along line 15-15 of FIG. 6 showing that, in the powered gross-movement mode, the plurality of pawls are disengaged with the mobile flange and the spur gear is meshed with the internal gear so that rotation of the spur gear causes the mobile flange to rotate at the second rotational speed.

During operation of occupant support 10, seat-motion controller 16 is configured to move seat back 14 relative to seat bottom 12 in one of the powered fine-adjustment mode and the powered gross-movement mode as suggested in FIGS. 11-15. FIGS. 10-12 show operation of seat-motion controller 16 in the powered fine-adjustment arrangement and FIGS. 13-15 show operation of seat-motion controller 16 in the powered gross-movement mode.

In the fine-adjustment mode, actuator 28 is not activated and bias member 56 urges cam-shaft unit 50 into the extended position as shown in FIG. 11. As a result, mode controller 30 is in the fine-adjustment arrangement and at least one of the plurality of pawls 52 is engaged with mobile flange 20 and spur gear 78 is disengaged from internal gear 76 as shown in FIGS. 10-12.

If electric energy is not supplied to motor 24 in the powered fine-adjustment mode, pawl teeth 74 block mobile flange 20 from rotating about seat-back pivot axis 15 to cause seat back 14 to be blocked from moving relative to seat bottom 12. As such, the position of seat back 14 relative to seat bottom 12 is set and motor controller 26 stores information indicative of the selected memory position of seat back 14 relative to seat bottom 12. As a non-limiting example, the information is indicative of an arrangement of components in motor 24.

If electric energy is supplied to motor 24 in the powered fine-adjustment mode, motor 24 rotates cam-shaft unit 50 about seat-back pivot axis 15 at the second rotational speed. As cam-shaft unit 50 rotates, eccentric-shaped cam 62 pushes pawls 52 into and out of engagement with mobile flange 20 in a predetermined pattern to cause pawls 52 to rotate mobile flange 20 at the first rotational speed as suggested in FIGS. 5 and 12. As a result, seat back 14 rotates relative to seat bottom 12 at the relatively slow first rotational speed.

To move from the powered fine-adjustment mode to the powered gross-movement mode, actuator 28 is activated and overcomes the bias of bias member 56 to move cam-shaft unit 50 into the retracted position as shown in FIGS. 14 and 15. Central hub 60 of rotor 54 is aligned axially with the plurality of pawls 52 as shown in FIG. 14. As a result, the plurality of pawls 52 move radially inwardly and are spaced apart from mobile flange 20 as shown in FIG. 15. Spur gear 78 moves axially with rotor 54 and meshes with internal gear 76 as shown in FIG. 14. As a result, external teeth 88 included in spur gear 78 mesh with internal teeth 82 included in internal gear 76.

Electric energy is supplied to motor 24 to cause motor 24 to rotate cam-shaft unit 50 and, thus, spur gear 78 about seat-back pivot axis 15 at the second rotational speed as suggested in FIGS. 13-15. Rotation of spur gear 78 causes rotation of internal gear 76 about seat-back pivot axis 15 at the second rotational speed. Mobile flange 20 is coupled to internal gear 76 for rotation therewith and, as a result, seat back 14 rotates about seat-back pivot axis 15 at the second rotational speed.

After seat back 14 is moved to a desired position in the powered gross-movement mode, actuator 28 is deactivated to move seat-motion controller 16 from the powered gross-movement mode to the powered fine-adjustment mode. When actuator 28 is deactivated, bias member 56 urges cam-shaft unit 50 to move into the extended position as shown in FIGS. 10 and 11. In the fine-adjustment mode, at least one pawl 52 blocks rotation of mobile flange 20 to block rotation of seat back 14 relative to seat bottom 12.

In the illustrative embodiment, recliner control unit 22 further includes motor controller 26 as shown in FIG. 10.

Motor controller 26 is configured to store the selected memory position of seat back 14 relative to seat bottom 12 and to control motor 24 to cause motor 24 to move seat back 14 to the selected memory position in response to an input. Motor controller 26 includes one or more of a potentiometer, a hall-effect sensor, a controller configured to ripple count, an accelerometer, a radio-frequency identification sensor, combinations thereof, or any other suitable alternative.

In some embodiments, recliner control unit 22 is rotated manually by the operator in the gross-movement mode. In some embodiments, recliner control unit 22 is rotated manually by the operator in the fine-adjustment mode.

In some embodiments, recliner control unit 22 is configured to rotate at a first rotational speed to cause mobile flange 20 to rotate at a second rotational speed when seat-motion controller 16 is in the fine-adjustment mode. Recliner control unit 22 is configured to rotate at a third rotational speed to cause mobile flange 20 to rotate at a fourth rotational speed in the gross-movement mode.

A first speed ratio is defined by the first rotational speed and the second rotational speed. A second speed ratio is defined by the third rotational speed and the fourth rotational speed. In some embodiments, the second speed ratio is different than the first speed ratio. In some embodiments, the first rotational speed is equal to the third rotational speed. In some embodiments, the second rotational speed is different than the fourth rotational speed. In some embodiments, the fourth rotational speed is equal to the first rotational speed.

Another embodiment of an occupant support 210 in accordance with the present disclosure is shown in FIGS. 16-20. Occupant support 210 is substantially similar to occupant support 10 shown in FIGS. 1-15 and described herein. Accordingly, similar reference numbers indicate features that are common between occupant support 10 and occupant support 210. The description of occupant support 10 is incorporated by reference to apply to occupant support 210, except in instances when it conflicts with the specific description and the drawings of occupant support 210.

Figure 16:
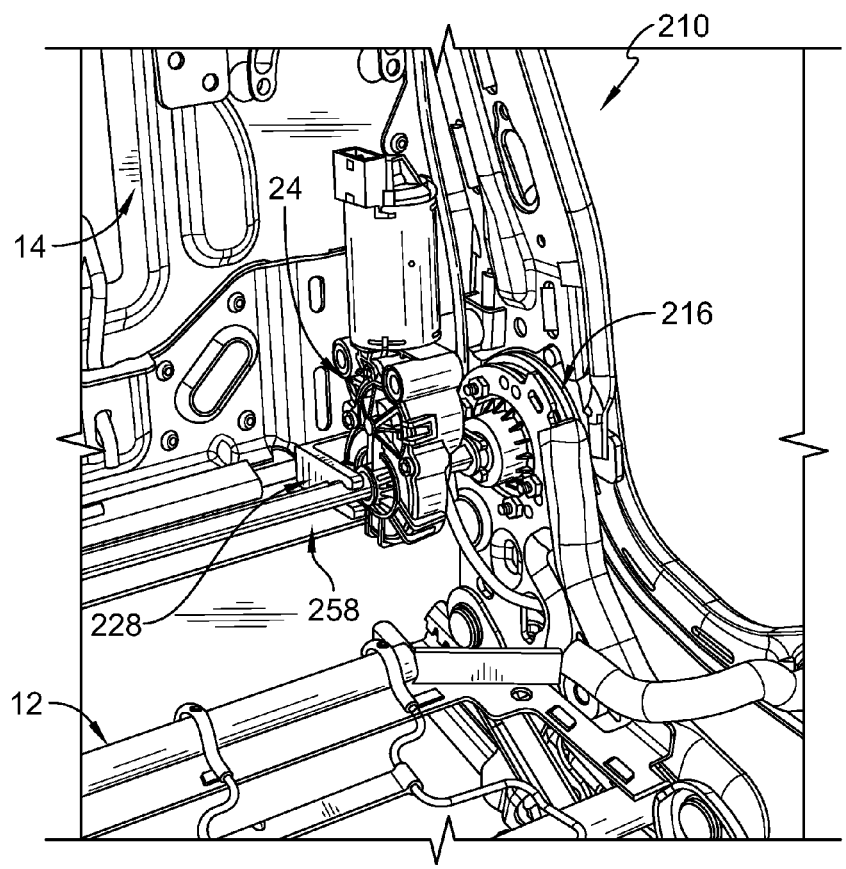
FIG. 16 is a perspective view of another embodiment of an occupant support showing that the occupant support includes the seat bottom mounted to the floor of the vehicle, the seat back mounted to the seat bottom to pivot relative to the seat bottom, and a seat-motion controller coupled to the seat bottom and the seat back to control motion of the seat back about a seat-back pivot axis relative to the seat bottom.
Figure 17:
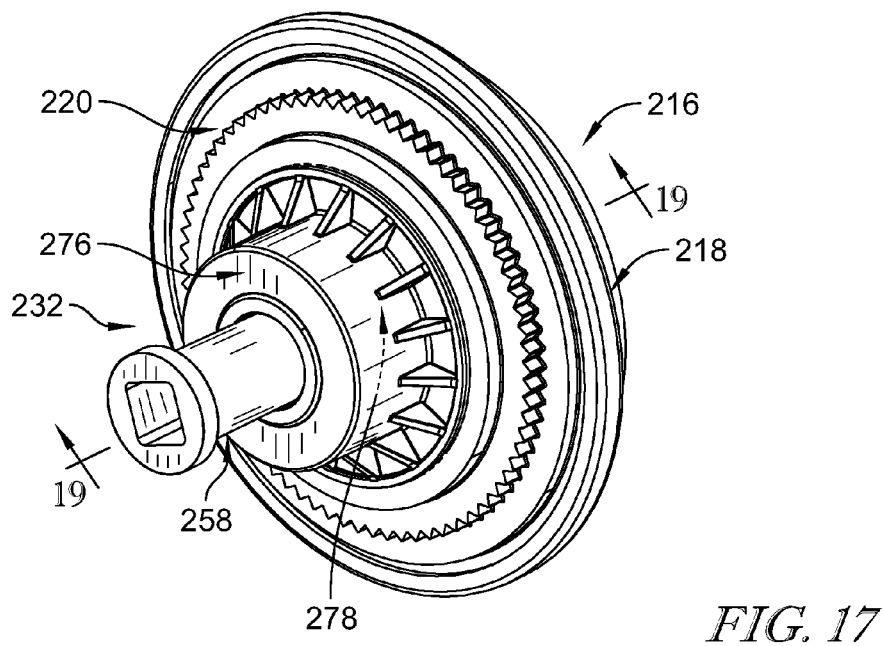
FIG. 17 is a perspective view of the seat-motion controller included in the occupant support of FIG. 16.
Figure 18:
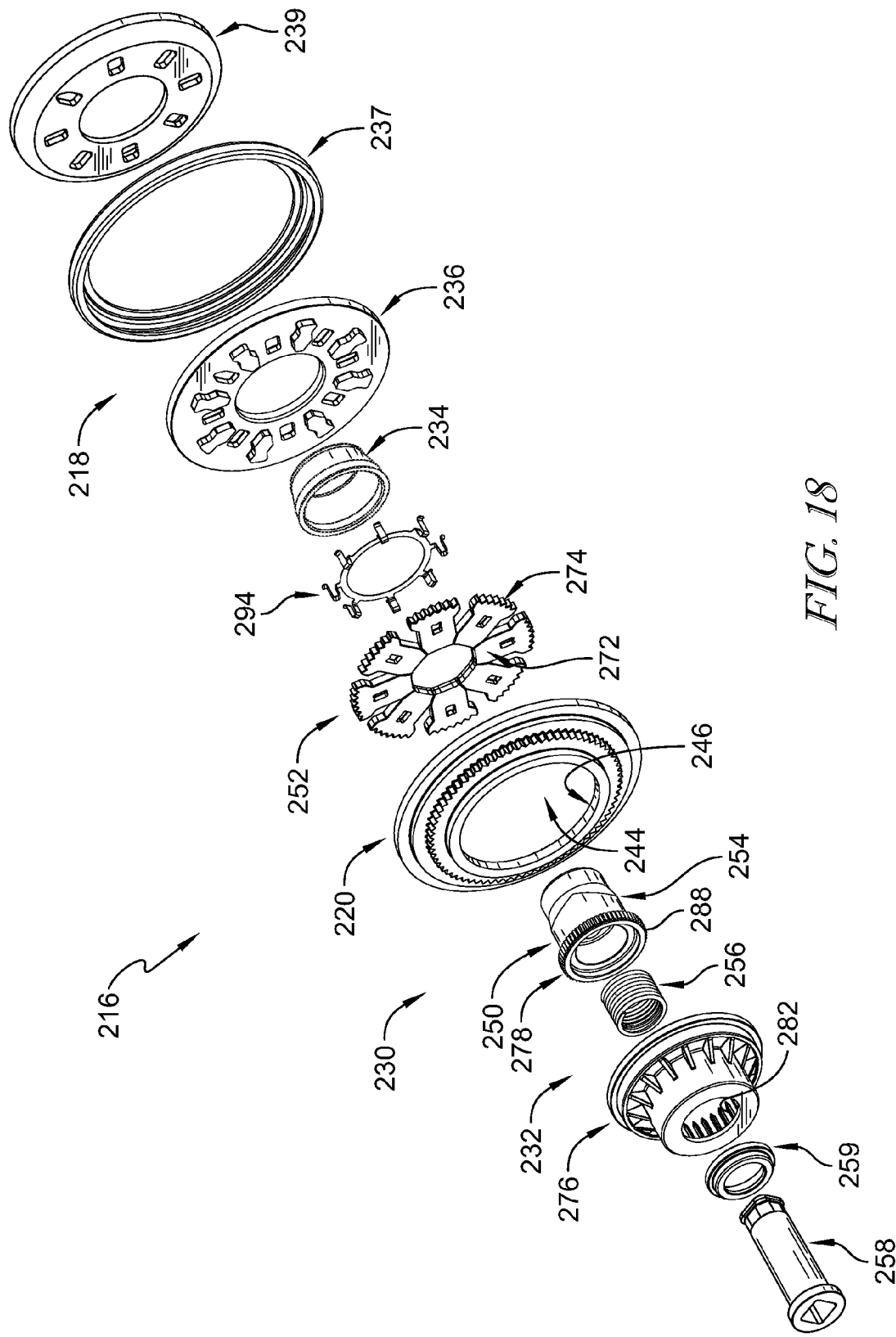
FIG. 18 is an exploded view of the seat-motion controller included in the occupant support of FIG. 16.

Occupant support 210 includes seat bottom 12, seat back 14, and a seat-motion controller 216 configured to move seat back 14 relative to seat bottom 12 as shown in FIGS. 16 and 17. Seat-motion controller 216 includes a fixed flange 218, a mobile flange 220, and a recliner control unit 222 as shown in FIGS. 17 and 18. Recliner control unit 222 includes a mode controller 230 and a gross-movement driver 232 as shown in FIG. 18. Gross-movement driver 232 includes a first gear 276 coupled to mobile flange 220 and a second gear 278 integrated with mode controller 230.

Fixed flange 218 is coupled to seat back 14 as suggested in FIG. 16. Fixed flange 218 includes a bushing 234, a static disc 236, an outer band 237, and a support plate 239 as shown in FIG. 18. Bushing 234 is arranged circumferentially about a seat-back pivot axis 215 and a portion of recliner control unit 222. Static disc 236 extends radially outward away from bushing 234 and is coupled to seat bottom 12 for movement therewith. Outer band 237 and support plate 239 are coupled to static disc 236.

Mobile flange 220 is coupled to seat bottom 12 as suggested in FIG. 17. Mobile flange 220 is formed to include an aperture 244 and a plurality of flange teeth 246 as shown in FIG. 18. A cam-shaft unit 250 included in mode controller 230 extends through aperture 244. The plurality of flange teeth 246 are arranged circumferentially about seat-back pivot axis 215 and extend radially inwardly toward seat-back pivot axis 215.

Recliner control unit 222 includes mode controller 230 and gross-movement driver 232 as shown in FIG. 18. Mode controller 230 moves recliner control unit 222 between the powered fine-adjustment mode and the powered gross-movement mode in response to input activating actuator 228. Mode controller 230 rotates mobile flange 220 at the first rotational speed relative to fixed flange 218 in response to operator input when recliner control unit 222 is in the powered fine-adjustment mode. Gross-movement driver 232 rotates mobile flange 220 at a second rotational speed relative to fixed flange 218 in response to operator input when recliner control unit 222 is in the powered gross-movement mode. The second rotational speed is different than the first rotational speed. In the illustrative embodiment, recliner control unit 22 further includes motor controller 26.

Mode controller 230 includes cam-shaft unit 250 and a plurality of pawls 252 as shown in FIG. 18. Cam-shaft unit 250 extends along seat-back pivot axis 215 and is configured to move mode controller 230 between a fine-adjustment arrangement, shown in FIG. 19, and a gross-movement arrangement, shown in FIG. 20, in response to activation of actuator 228. Seat-motion controller 216 is in the powered fine-adjustment mode when mode controller 230 is in the fine-adjustment arrangement and seat-motion controller 216 is in the powered gross-movement mode when mode controller 230 is in the gross-movement arrangement. The plurality of pawls 252 are arranged circumferentially about cam-shaft unit 250 and move radially outwardly and inwardly relative to seat-back pivot axis 215 in response to rotation of cam-shaft unit 250.

Cam-shaft unit 250 includes a rotor 254, a bias member 256, a drive shaft 258, and a retainer 259 as shown in FIG. 18. Rotor 254 is configured to push pawls 252 radially outward toward mobile flange 220 or allow pawls 252 to move radially inward toward seat-back pivot axis 215. Bias member 256 is positioned between rotor 254 and fixed flange 218 and biases rotor 254 away from fixed flange 218 to bias cam-shaft unit 250 toward the extended position and away from the retracted position as suggested in FIG. 19. Drive shaft 258 is coupled to motor 24 and rotor 254 for axial and rotational movement therewith. Retainer 259 extends around drive shaft 258 and blocks movement of bias member 256. As shown in FIG. 17, motor 24 is coupled to seat back 14 for movement therewith.

Figure 19:
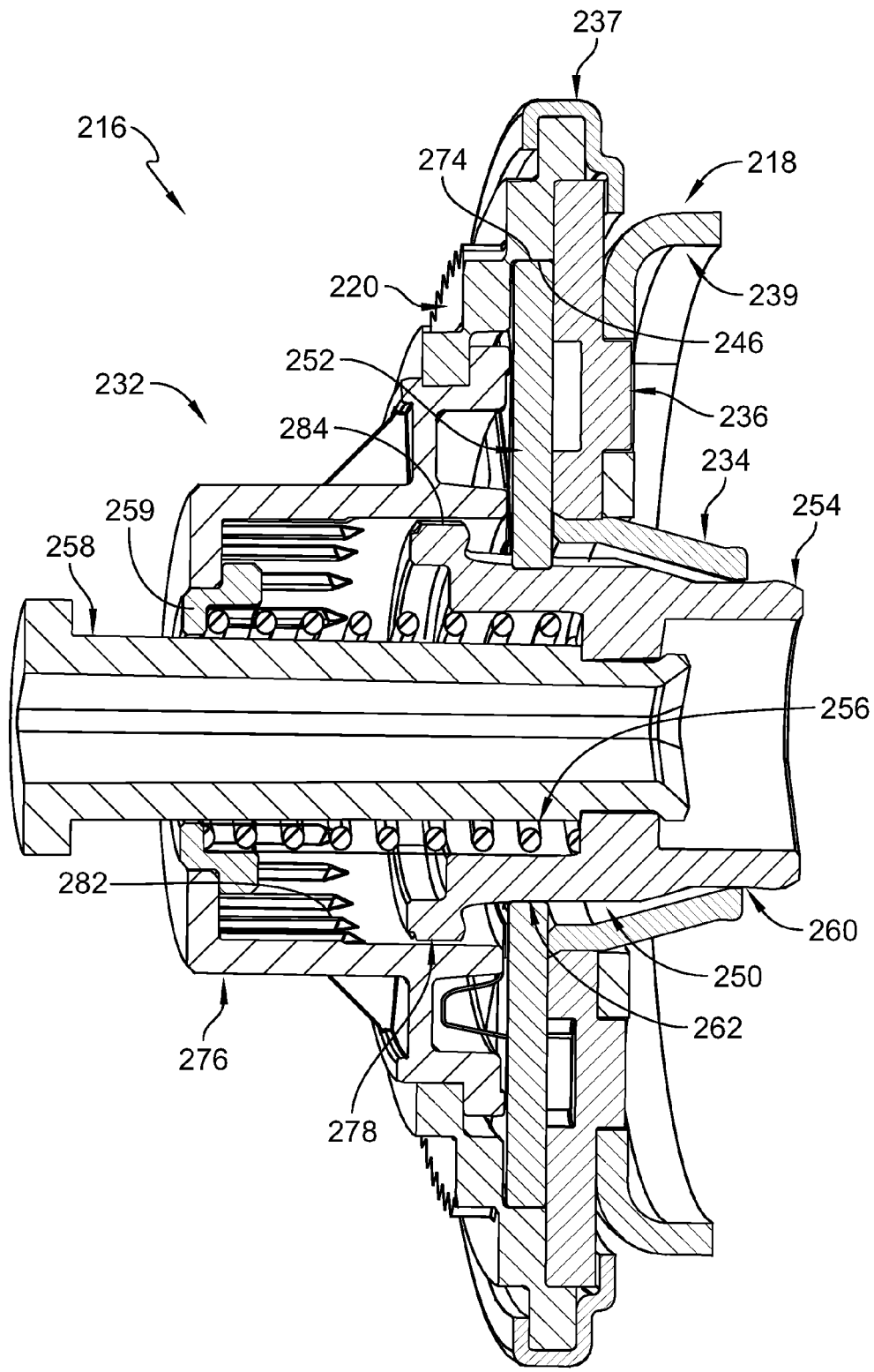
FIG. 19 is a sectional view of the seat-motion controller taken along line 19-19 of FIG. 17 showing the seat-motion controller in the powered fine-adjustment mode in which the spur gear is disengaged from the internal gear and one or more of the plurality of pawls are engaged with the mobile flange.
Figure 20:
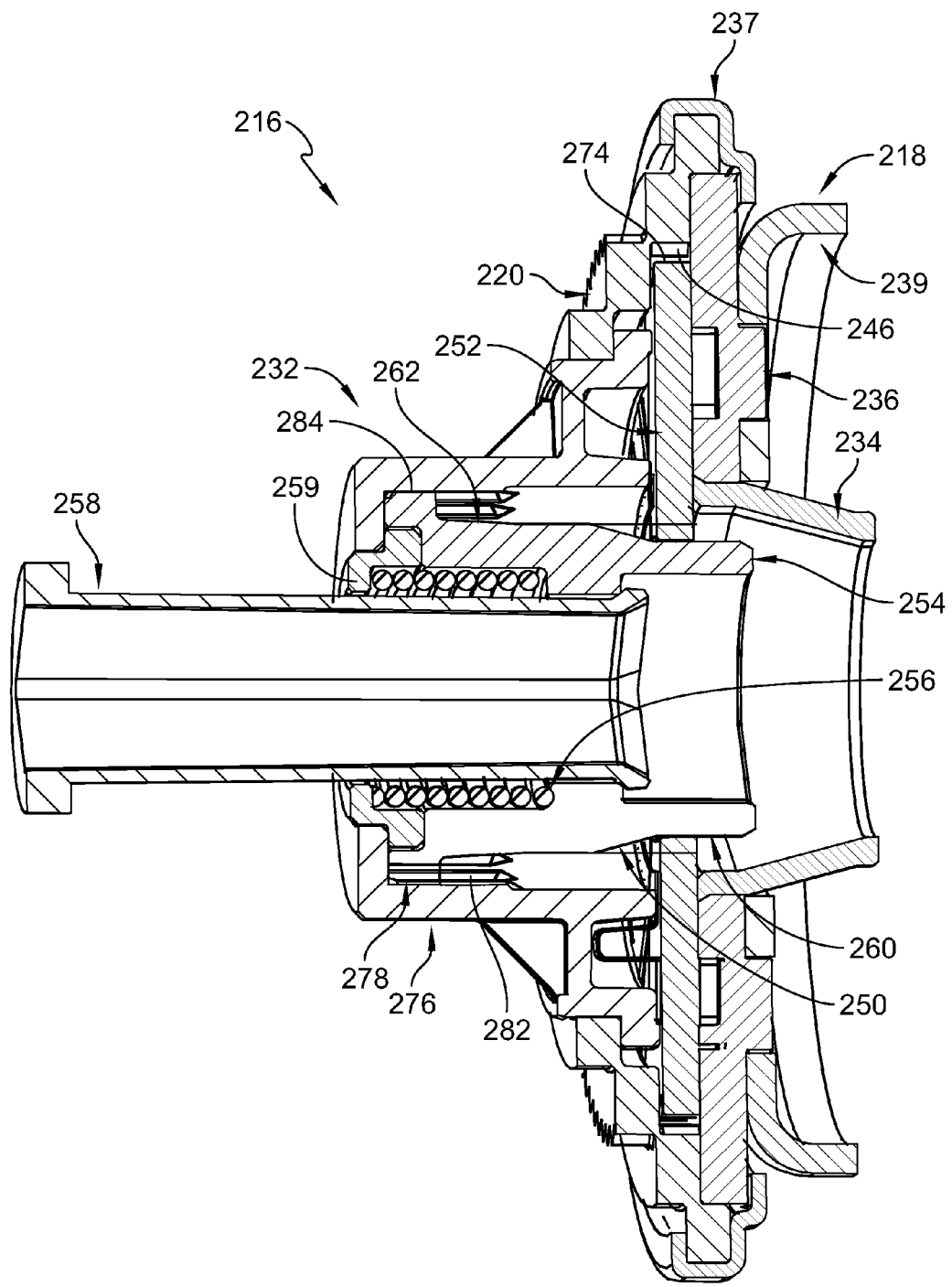
FIG. 20 is a sectional view similar to FIG. 19 showing the seat-motion controller in the powered gross-movement mode in which the spur gear is engaged with the internal gear and the plurality of pawls are disengaged from the mobile flange.

Each pawl 252 includes a pawl body 272 and a plurality of pawl teeth 274 that extend radially outward away from pawl body 272 as shown in FIGS. 18-20. Pawl teeth 274 are adapted to engage and disengage flange teeth 246 included in mobile flange 220 to control movement of mobile flange 220. Pawl teeth 274 of at least one pawl 252 engage flange teeth 246 included in mobile flange 220 to block rotation of mobile flange 220 when seat-motion controller 216 is in the powered fine-adjustment arrangement and motor 24 is not energized. Pawl teeth 274 move into and out of engagement with flange teeth 246 in a predetermined pattern to rotate mobile flange 220 incrementally when seat-motion controller 216 is in the powered fine-adjustment arrangement and motor 24 is energized. Pawl teeth 274 are spaced apart from flange teeth 246 when seat-motion controller 216 is in the powered gross-movement mode to allow gross-movement driver 232 to rotate mobile flange 220 as suggested in FIG. 20.

In the illustrative embodiment, mode controller 230 further includes a pawl retainer 294 as shown in FIGS. 18-20. Pawl retainer 294 reduces or eliminates interaction (sometimes called ratcheting) between mobile flange 220 and pawls 252 when seat-motion controller 216 is in the gross-movement mode.

Gross-movement driver 232 includes internal gear 276 and spur gear 278 as shown in FIGS. 18-20. Internal gear 276 is coupled to mobile flange 220 for movement therewith. Spur gear 278 is coupled to cam-shaft unit 250 and configured to rotate internal gear 276 and, thus, mobile flange 220 when seat-motion controller 216 is in the powered gross-movement mode. Spur gear 278 is integrally coupled to rotor 254 as shown in FIG. 18.

Internal gear 276 includes a plurality of internal teeth 282 that extend radially inwardly toward seat-back pivot axis 215 as shown in FIGS. 18-20. Spur gear 278 includes a plurality of external teeth 288. External teeth 288 extend radially outward away from rotor 54 and seat-back pivot axis 215 toward internal gear 276. External teeth 288 are configured to mesh with internal teeth 282 included in internal gear 276 to mate internal gear 276 with spur gear 278 for rotational movement therewith.

During operation of occupant support 210, seat-motion controller 216 is configured to move seat back 14 relative to seat bottom 12 in one of the powered fine-adjustment mode and the powered gross-movement mode as suggested in FIGS. 19 and 20. FIG. 19 shows operation of seat-motion controller 216 in the powered fine-adjustment arrangement and FIG. 20 shows operation of seat-motion controller 216 in the powered gross-movement mode.

In the fine-adjustment mode, actuator 228 is not activated and bias member 256 urges cam-shaft unit 250 into the extended position as shown in FIG. 19. As a result, mode controller 230 is in the fine-adjustment arrangement and at least one of the plurality of pawls 252 is engaged with mobile flange 220. Spur gear 278 is disengaged from internal gear 276.

If electric energy is not supplied to motor 24 in the powered fine-adjustment mode, pawl teeth 274 block mobile flange 220 from rotating about seat-back pivot axis 215 to cause seat back 14 to be blocked from moving relative to seat bottom 12. As such, the position of seat back 14 relative to seat bottom 12 is set and motor controller 26 stores information indicative of the selected memory position of seat back 14 relative to seat bottom 12.

If electric energy is supplied to motor 24 in the powered fine-adjustment mode, motor 24 rotates cam-shaft unit 250 about seat-back pivot axis 215 at the second rotational speed. As cam-shaft unit 250 rotates, eccentric-shaped cam 262 pushes pawls 252 into and out of engagement with mobile flange 220 in a predetermined pattern to cause pawls 252 to rotate mobile flange 220 at the first rotational speed.

To move from the powered fine-adjustment mode to the powered gross-movement mode, actuator 228 is activated and overcomes the bias of bias member 256 to move cam-shaft unit 250 into the retracted position as shown in FIG. 20. A central hub 260 of rotor 254 is aligned axially with the plurality of pawls 252. As a result, the plurality of pawls 252 move radially inwardly and are spaced apart from mobile flange 220. Spur gear 278 moves axially with rotor 254 and meshes with internal gear 276. As a result, external teeth 288 included in spur gear 278 mesh with internal teeth 282 included in internal gear 76.

Electric energy is supplied to motor 24 to cause motor 24 to rotate cam-shaft unit 250 and, thus, spur gear 278 about seat-back pivot axis 215 at the second rotational speed. Rotation of spur gear 278 causes rotation of internal gear 276 about seat-back pivot axis 215 at the second rotational speed. Mobile flange 220 is coupled to internal gear 276 for rotation therewith and, as a result, seat back 14 rotates about seat-back pivot axis 215 at the second rotational speed.

After seat back 14 is moved to a desired position in the powered gross-movement mode, actuator 228 is deactivated to move seat-motion controller 216 from the powered gross-movement mode to the powered fine-adjustment mode. When actuator 228 is deactivated, bias member 256 urges cam-shaft unit 250 to move into the extended position. In the fine-adjustment mode, at least one pawl 252 blocks rotation of mobile flange 220 to block rotation of seat back 14 relative to seat bottom 12.

The following numbered clauses include embodiments that are contemplated and non-limiting:

Clause 1. An occupant support comprising
a seat bottom, and
a seat back coupled to the seat bottom for movement about a seat-back pivot axis relative to the seat bottom between an upright position and a folded-forward position.

Clause 2. The occupant support of clause 1, any other clause, or any combination of clauses, further comprising a seat-motion controller configured to provide means for controlling movement of the occupant support in one of a powered fine-adjustment mode in which the seat back rotates about the seat-back pivot axis relative to the seat bottom between the upright position and the folded-forward position at a first rotational speed in response to an electric energy being supplied to a motor connected to the seat-motion controller and a powered gross-movement mode in which the seat back rotates about the seat-back pivot axis relative to the seat bottom at a second rotational speed greater than the first rotational speed between the upright position and the folded-forward position in response to the electric energy being supplied to the motor.

Clause 3. The occupant support of clause 2, any other clause, or any combination of clauses, wherein the seat-motion controller includes a fixed flange coupled to the seat bottom, a mobile flange coupled to the seat back for rotation with the seat back about the seat-back pivot axis relative to the fixed flange, and a recliner control unit configured to drive rotation of the mobile flange in the powered fine-adjustment mode and the powered gross-movement mode in response to the electric energy being supplied to the motor.

Clause 4. The occupant support of clause 3, any other clause, or any combination of clauses, wherein the recliner control unit includes a mode controller and a gross-movement driver, the mode controller rotates the mobile flange at the first rotational speed in response to the electric energy being supplied to the motor in the powered fine-adjustment mode, and the gross-movement driver rotates the mobile flange at the second rotational speed in response to the electric energy being supplied to the motor in the powered gross-movement mode.

Clause 5. The occupant support of clause 4, any other clause, or any combination of clauses, wherein the gross-movement driver includes an internal gear coupled to the mobile flange for rotational movement therewith and a spur gear coupled to the mode controller for rotational movement therewith, the spur gear is spaced apart from the internal gear in the powered fine-adjustment mode, and the spur gear is meshed with the internal gear in the powered gross-movement mode.

Clause 6. The occupant support of clause 5, any other clause, or any combination of clauses, wherein the mode controller includes a cam-shaft unit and a plurality of pawls, the cam-shaft unit is configured to rotate at the second rotational speed in response to the electric energy being supplied to the motor and is movable axially relative to the mobile flange between a first position and a second position, and the plurality of pawls are arranged circumferentially about the cam-shaft unit.

Clause 7. The occupant support of clause 6, any other clause, or any combination of clauses, wherein the spur gear is coupled to the cam-shaft unit for axial and rotational movement therewith and the spur gear is spaced apart from the internal gear and at least one of the plurality of pawls is engaged with the mobile flange when the cam-shaft unit is in the first position.

Clause 8. The occupant support of clause 6, any other clause, or any combination of clauses, wherein the spur gear is coupled to the cam-shaft unit for axial and rotational movement therewith and the spur gear is meshed with the internal gear and the plurality of pawls are disengaged from the mobile flange when the cam-shaft unit is in the second position.

Clause 9. The occupant support of clause 3, any other clause, or any combination of clauses, wherein the recliner control unit blocks the seat back from rotating relative to the seat bottom in response to the electric energy not being supplied to the motor in the powered fine-adjustment mode to lock the seat back in a selected memory position relative to the seat bottom.

Clause 10. The occupant support of clause 9, any other clause, or any combination of clauses, wherein the seat-motion controller further includes a motor controller configured to store information indicative of the selected memory position and to control the motor to cause the motor to move the seat back to the selected memory position in response to an input.

Clause 11. The occupant support of clause 10, any other clause, or any combination of clauses, wherein the motor controller includes one or more of a potentiometer, a hall-effect sensor, a controller configured to ripple count, an accelerometer, and a radio-frequency identification sensor.

Clause 12. The occupant support of clause 1, any other clause, or any combination of clauses, further comprising a seat-motion controller configured to control movement of the occupant support in one of a fine-adjustment mode and a gross-movement mode, the seat-motion controller including a fixed flange coupled to the seat bottom, a mobile flange coupled to the seat back for rotation with the seat back about the seat-back pivot axis relative to the fixed flange, and a recliner control unit configured to rotate the mobile flange about the seat-back pivot axis relative to the fixed flange.

Clause 13. The occupant support of clause 12, any other clause, or any combination of clauses, wherein the seat-motion controller is movable between a powered fine-adjustment mode in which the recliner control unit is configured to rotate the mobile flange at a first rotational speed in response to an electric energy being supplied to a motor connected to the recliner control unit and a powered gross-movement mode in which the recliner control unit is configured to rotate the mobile flange about the seat-back pivot axis relative to the fixed flange at a second rotational speed in response to the electric energy being supplied to the motor and the second rotational speed is different than the first rotational speed.

Clause 14. The occupant support of clause 13, any other clause, or any combination of clauses, wherein the recliner control unit includes a gross-movement driver that includes a first gear configured to drive the mobile flange about the seat-back pivot axis and a second gear configured to mate with the first gear and drive the first gear, the second gear is spaced apart from the first gear in the fine-adjustment mode, and the second gear is meshed with the first gear in the gross-movement mode.

Clause 15. The occupant support of clause 14, any other clause, or any combination of clauses, wherein the first gear includes radially inwardly extending teeth and the second gear includes radially outwardly extending teeth configured to mesh with the radially inwardly extending teeth included in the first gear.

Clause 16. The occupant support of clause 14, any other clause, or any combination of clauses, wherein the recliner control unit further includes a mode controller that includes a cam-shaft unit and a plurality of pawls, the cam-shaft unit is configured to rotate at the second rotational speed in response to the electric energy being supplied to the motor, and the plurality of pawls are arranged circumferentially about the cam-shaft unit.

Clause 17. The occupant support of clause 16, any other clause, or any combination of clauses, wherein the cam-shaft unit is movable between a first position and a second position, the second gear is coupled to the cam-shaft unit for axial and rotational movement therewith, the cam-shaft unit urges at least one of the plurality of pawls radially toward the mobile flange and the second gear is spaced apart from the first gear when the cam-shaft unit is in the first position, the plurality of pawls are spaced apart from the mobile flange and the second gear is meshed with the first gear when the cam-shaft unit is in the second position.

Clause 18. The occupant support of clause 16, any other clause, or any combination of clauses, wherein rotation of the cam-shaft unit causes the plurality of pawls to move radially inward and outward relative to the seat-back pivot axis in a predetermined sequence to cause the plurality of pawls to rotate the mobile flange at the first rotational speed.

Clause 19. The occupant support of clause 13, any other clause, or any combination of clauses, wherein the recliner control unit includes a plurality of pawls configured move in a predetermined pattern in response to the electric energy being supplied to the motor and a gear configured to rotate at the second rotational speed in response to the electric energy being supplied to the motor, movement of the plurality of pawls in the predetermined pattern causes the mobile flange to rotate at the first rotational speed in the powered fine-adjustment mode, and rotation of the gear causes the mobile flange to rotate at the second rotational speed in the powered gross-movement mode.

Clause 20. The occupant support of clause 13, any other clause, or any combination of clauses, wherein the recliner control unit blocks the seat back from rotating relative to the seat bottom in response to the electric energy not being supplied to the motor in the fine-adjustment mode to lock the seat back in a selected memory position relative to the seat bottom.

Clause 21. The occupant support of clause 20, any other clause, or any combination of clauses, wherein the seat-motion controller further includes a motor controller configured to store information indicative of the selected memory position of the seat back relative to the seat bottom and to control the motor to cause the motor to move the seat back to the selected memory position in response to an input.

Clause 22. The occupant support of clause 21, any other clause, or any combination of clauses, wherein the motor controller includes one or more of a potentiometer, a hall-effect sensor, a controller configured to ripple count, an accelerometer, and a radio-frequency identification sensor.

Clause 23. The occupant support of clause 1, any other clause, or any combination of clauses, further comprising a seat-motion controller including a fixed flange coupled to the seat bottom, a mobile flange coupled to the seat back for rotation with the seat back about the seat-back pivot axis relative to the fixed flange, and a recliner control unit configured to rotate the mobile flange about the seat-back pivot axis relative to the fixed flange, wherein the seat-motion controller is movable between a fine-adjustment mode in which the recliner control unit is configured to rotate at a first rotational speed to cause the mobile flange to rotate at a second rotational speed and a gross-movement mode in which the recliner control unit is configured to rotate at a third rotational speed to cause the mobile flange to rotate at a fourth rotational speed.

Clause 24. The occupant support of clause 23, any other clause, or any combination of clauses, wherein a first speed ratio is defined by the first rotational speed and the second rotational speed, a second speed ratio is defined by the third rotational speed and the fourth rotational speed, and the second speed ratio is different than the first speed ratio.

Clause 25. The occupant support of clause 23, any other clause, or any combination of clauses, wherein the first rotational speed is equal to the third rotational speed and the second rotational speed is different than the fourth rotational speed.

Clause 26. The occupant support of clause 25, any other clause, or any combination of clauses, wherein the fourth rotational speed is equal to the first rotational speed.

Clause 27. The occupant support of clause 23, any other clause, or any combination of clauses, wherein the recliner control unit includes a gross-movement driver that includes a first gear configured to drive the mobile flange about the seat-back pivot axis and a second gear configured to mate with the first gear and drive the first gear, the second gear is spaced apart from the first gear in the fine-adjustment mode, and the second gear is meshed with the first gear in the gross-movement mode.

Clause 28. The occupant support of clause 27, any other clause, or any combination of clauses, wherein the recliner control unit further includes a mode controller that includes a cam-shaft unit and a plurality of pawls arranged circumferentially about the cam-shaft unit, the cam-shaft unit is movable between a first position and a second position, the second gear is coupled to the cam-shaft unit for axial and rotational movement therewith, the cam-shaft unit urges at least one of the plurality of pawls radially toward the mobile flange and the second gear is spaced apart from the first gear when the cam-shaft unit is in the first position, the plurality of pawls are spaced apart from the mobile flange and the second gear is meshed with the first gear when the cam-shaft unit is in the second position.

Clause 29. The occupant support of clause 28, any other clause, or any combination of clauses, wherein rotation of the cam-shaft unit causes the plurality of pawls to move radially inward and outward relative to the seat-back pivot axis in a predetermined sequence to cause the plurality of pawls to rotate the mobile flange.

Clause 30. The occupant support of clause 23, any other clause, or any combination of clauses, wherein the recliner control unit includes a cam-shaft unit, a plurality of pawls configured move in a predetermined pattern in response to rotation of the cam-shaft unit, and a gear configured to rotate at the second rotational speed in response to rotation of the cam-shaft unit, movement of the plurality of pawls in the predetermined pattern causes the mobile flange to rotate in the fine-adjustment mode, and rotation of the gear causes the mobile flange to rotate in the gross-movement mode.

Clause 31. The occupant support of clause 23, any other clause, or any combination of clauses, wherein the recliner control unit blocks the seat back from rotating relative to the seat bottom in response to the recliner control unit not rotating when the recliner control unit is in the fine-adjustment mode to lock the seat back in a selected memory position relative to the seat bottom.

Clause 32. The occupant support of clause 31, any other clause, or any combination of clauses, wherein the seat-motion controller further includes a motor configured to rotate the recliner control unit and a motor controller configured to store information indicative of the selected memory position of the seat back relative to the seat bottom and to control the motor to cause the motor to move the seat back to the selected memory position in response to an input.

The invention claimed is:

1. An occupant support comprising
a seat bottom,
a seat back coupled to the seat bottom for movement about a seat-back pivot axis relative to the seat bottom between an upright position and a folded-forward position, and
a seat-motion controller configured to provide means for controlling movement of the occupant support in one of a powered fine-adjustment mode in which the seat back rotates about the seat-back pivot axis relative to the seat bottom between the upright position and the folded-forward position at a first rotational speed in response to an electric energy being supplied to a motor connected to the seat-motion controller and a powered gross-movement mode in which the seat back rotates about the seat-back pivot axis relative to the seat bottom at a second rotational speed greater than the first rotational speed between the upright position and the folded-forward position in response to the electric energy being supplied to the motor,
wherein the seat-motion controller includes a fixed flange coupled to the seat bottom, a mobile flange coupled to the seat back for rotation with the seat back about the seat-back pivot axis relative to the fixed flange, and a recliner control unit configured to drive rotation of the mobile flange in the powered fine-adjustment mode and the powered gross-movement mode in response to the electric energy being supplied to the motor,
wherein the recliner control unit includes a mode controller and a gross-movement driver, the mode controller rotates the mobile flange at the first rotational speed in response to the electric energy being supplied to the motor in the powered fine-adjustment mode, and the gross-movement driver rotates the mobile flange at the second rotational speed in response to the electric energy being supplied to the motor in the powered gross-movement mode.

2. The occupant support of claim 1, wherein the gross-movement driver includes an internal gear coupled to the mobile flange for rotational movement therewith and a spur gear coupled to the mode controller for rotational movement therewith, the spur gear is spaced apart from the internal gear in the powered fine-adjustment mode, and the spur gear is meshed with the internal gear in the powered gross-movement mode.

3. The occupant support of claim 2, wherein the mode controller includes a cam-shaft unit and a plurality of pawls, the cam-shaft unit is configured to rotate at the second rotational speed in response to the electric energy being supplied to the motor and is movable axially relative to the mobile flange between a first position and a second position, and the plurality of pawls are arranged circumferentially about the cam-shaft unit.

4. The occupant support of claim 3, wherein the spur gear is coupled to the cam-shaft unit for axial and rotational movement therewith and the spur gear is spaced apart from the internal gear and at least one of the plurality of pawls is engaged with the mobile flange when the cam-shaft unit is in the first position.

5. The occupant support of claim 3, wherein the spur gear is coupled to the cam-shaft unit for axial and rotational movement therewith and the spur gear is meshed with the internal gear and the plurality of pawls are disengaged from the mobile flange when the cam-shaft unit is in the second position.

6. The occupant support of claim 1, wherein the recliner control unit blocks the seat back from rotating relative to the seat bottom in response to the electric energy not being supplied to the motor in the powered fine-adjustment mode to lock the seat back in a selected memory position relative to the seat bottom.

7. The occupant support of claim 6, wherein the seat-motion controller further includes a motor controller configured to store information indicative of the selected memory position and to control the motor to cause the motor to move the seat back to the selected memory position in response to an input.

8. The occupant support of claim 7, wherein the motor controller includes one or more of a potentiometer, a hall-effect sensor, a controller configured to ripple count, an accelerometer, and a radio-frequency identification sensor.

9. An occupant support comprising
a seat bottom,
a seat back coupled to the seat bottom for movement about a seat-back pivot axis relative to the seat bottom between an upright position and a folded-forward position, and
a seat-motion controller including a fixed flange coupled to the seat bottom, a mobile flange coupled to the seat back for rotation with the seat back about the seat-back pivot axis relative to the fixed flange, and a recliner control unit configured to rotate the mobile flange about the seat-back pivot axis relative to the fixed flange,
wherein the seat-motion controller is movable between a fine-adjustment mode in which the recliner control unit is configured to rotate at a first rotational speed to cause the mobile flange to rotate at a second rotational speed and a gross-movement mode in which the recliner control unit is configured to rotate at a third rotational speed to cause the mobile flange to rotate at a fourth rotational speed,
wherein the first rotational speed is equal to the third rotational speed and the second rotational speed is different than the fourth rotational speed.

10. The occupant support of claim 9, wherein a first speed ratio is defined by the first rotational speed and the second rotational speed, a second speed ratio is defined by the third rotational speed and the fourth rotational speed, and the second speed ratio is different than the first speed ratio.

11. The occupant support of claim 9, wherein the fourth rotational speed is equal to the first rotational speed.

12. The occupant support of claim 9, wherein the recliner control unit includes a cam-shaft unit, a plurality of pawls configured move in a predetermined pattern in response to rotation of the cam-shaft unit, and a gear configured to rotate at the second rotational speed in response to rotation of the cam-shaft unit, movement of the plurality of pawls in the predetermined pattern causes the mobile flange to rotate in the fine-adjustment mode, and rotation of the gear causes the mobile flange to rotate in the gross-movement mode.

13. The occupant support of claim 9, wherein the recliner control unit blocks the seat back from rotating relative to the seat bottom in response to the recliner control unit not rotating when the recliner control unit is in the fine-adjustment mode to lock the seat back in a selected memory position relative to the seat bottom.

14. The occupant support of claim 13, wherein the seat-motion controller further includes a motor configured to rotate the recliner control unit and a motor controller configured to store information indicative of the selected memory position of the seat back relative to the seat bottom and to control the motor to cause the motor to move the seat back to the selected memory position in response to an input.

15. An occupant support comprising
a seat bottom,
a seat back coupled to the seat bottom for movement about a seat-back pivot axis relative to the seat bottom between an upright position and a folded-forward position, and
a seat-motion controller including a fixed flange coupled to the seat bottom, a mobile flange coupled to the seat back for rotation with the seat back about the seat-back pivot axis relative to the fixed flange, and a recliner control unit configured to rotate the mobile flange about the seat-back pivot axis relative to the fixed flange,
wherein the seat-motion controller is movable between a fine-adjustment mode in which the recliner control unit is configured to rotate at a first rotational speed to cause the mobile flange to rotate at a second rotational speed and a gross-movement mode in which the recliner control unit is configured to rotate at a third rotational speed to cause the mobile flange to rotate at a fourth rotational speed,
wherein the recliner control unit includes a gross-movement driver that includes a first gear configured to drive the mobile flange about the seat-back pivot axis and a second gear configured to mate with the first gear and drive the first gear, the second gear is spaced apart from the first gear in the fine-adjustment mode, and the second gear is meshed with the first gear in the gross-movement mode.

16. The occupant support of claim 15, wherein the recliner control unit further includes a mode controller that includes a cam-shaft unit and a plurality of pawls arranged circumferentially about the cam-shaft unit, the cam-shaft unit is movable between a first position and a second position, the second gear is coupled to the cam-shaft unit for axial and rotational movement therewith, the cam-shaft unit urges at least one of the plurality of pawls radially toward the mobile flange and the second gear is spaced apart from the first gear when the cam-shaft unit is in the first position, the plurality of pawls are spaced apart from the mobile flange and the second gear is meshed with the first gear when the cam-shaft unit is in the second position.

17. The occupant support of claim 16, wherein rotation of the cam-shaft unit causes the plurality of pawls to move radially inward and outward relative to the seat-back pivot axis in a predetermined sequence to cause the plurality of pawls to rotate the mobile flange.

* * * * *